US011740161B2

United States Patent
Finlay et al.

(10) Patent No.: US 11,740,161 B2
(45) Date of Patent: Aug. 29, 2023

(54) FILTERS FOR MIMICKING REGIONAL LUNG DEPOSITION

(71) Applicant: The Governors of the University of Alberta, Edmonton (CA)

(72) Inventors: Warren H. Finlay, Edmonton (CA); Conor A. Ruzycki, Edmonton (CA); Andrew R. Martin, Edmonton (CA); Cagri Ayranci, Edmonton (CA); Scott E. Tavernini, Edmonton (CA)

(73) Assignee: THE GOVERNORS OF THE UNIVERSITY OF ALBERTA, Edmonton (CA)

( * ) Notice: Subject to any disclaimer, the term of this patent is extended or adjusted under 35 U.S.C. 154(b) by 474 days.

(21) Appl. No.: 16/770,316

(22) PCT Filed: Dec. 7, 2018

(86) PCT No.: PCT/CA2018/051568
§ 371 (c)(1),
(2) Date: Jun. 5, 2020

(87) PCT Pub. No.: WO2019/109192
PCT Pub. Date: Jun. 13, 2019

(65) Prior Publication Data
US 2021/0172840 A1 Jun. 10, 2021

Related U.S. Application Data

(60) Provisional application No. 62/595,641, filed on Dec. 7, 2017.

(51) Int. Cl.
*G01N 1/22* (2006.01)
*G01N 13/00* (2006.01)
*G09B 23/28* (2006.01)

(52) U.S. Cl.
CPC ............ *G01N 1/2205* (2013.01); *G01N 13/00* (2013.01); *G09B 23/288* (2013.01); *G01N 2001/2223* (2013.01); *G01N 2001/2288* (2013.01)

(58) Field of Classification Search
CPC ................. G01N 1/2205; G01N 13/00; G01N 2001/2223; G01N 2001/2288; G09B 23/288; G09B 23/30
See application file for complete search history.

(56) References Cited

U.S. PATENT DOCUMENTS

| | | | | |
|---|---|---|---|---|
| 4,461,183 | A * | 7/1984 | Wedding | G01N 1/2211 55/449 |
| 2014/0137523 | A1 * | 5/2014 | Ikeda | B01D 46/12 55/489 |
| 2016/0217709 | A1 * | 7/2016 | Minskoff | G09B 23/30 |

FOREIGN PATENT DOCUMENTS

| | | |
|---|---|---|
| CA | 2803088 A1 | 1/2012 |
| CA | 2998988 A1 | 3/2017 |

(Continued)

OTHER PUBLICATIONS

Hutten, Irvin M., Handbook of Nonwoven Filter Media, 2007, Wiley Publishing Inc., First Edition, pp. 29-70 (Year: 2007).*

(Continued)

*Primary Examiner* — David Z Huang
(74) *Attorney, Agent, or Firm* — MaxGoLaw PLLC

(57) ABSTRACT

A filter for mimicking regional lung deposition is provided that includes filter layers of fibrous filter material stacked coaxially and an outer ring portion encircling the fibrous filter material and securing the filter layers together. The fibrous filter material is formed for fibers having a fiber diameter, and the filter has a tunable filter efficiency. A regional lung deposition system capable of measuring constant flow or variable flow is provided that includes a throat (Continued)

simulation device, a filter housing downstream of and in fluid communication with the throat simulation device, a breath simulator downstream of and in fluid communication with the filter housing, and a an above-referenced filter positioned within the filter housing. Also provided is a filter housing for use in the regional lung deposition system that includes a conical housing having a small inner diameter at a first end and a large inner diameter at a second end.

20 Claims, 36 Drawing Sheets

(56) References Cited

FOREIGN PATENT DOCUMENTS

| GB | 2347879 A | 9/2000 |
|---|---|---|
| WO | 8602160 A1 | 4/1986 |
| WO | 2016144248 A1 | 9/2016 |

OTHER PUBLICATIONS

Int'l. Search Report for PCT/CA2018/051568, dated Feb. 20, 2019.
Koehler, Kirsten A. et Volkens, John. Developmentof a sampler to estimate regional deposition of aerosol in the human respiratory tract. Annals of occupational hygiene, 2013, vol. 57, No. 9, pp. 1138-1147.
Chen, Chih-Chieh, Lai, Chane-Yu, Shih, Tung-Sheng, et al. Development of respirable aerosol samplers using porous foams. American Industrial Hygiene Association Journal, 1998, vol. 59, No. 11, pp. 766-773.
Chung, K. Y. K., Aitken, R. J., et Bradley, D. R. Development and testing of a new sampler for welding fume. The Annals of Occupational Hygiene, 1997, vol. 41, No. 3, pp. 355-372.
Adams, Helen S., KENNY, Lee C., Nieuwenhuijsen, Mark J., et al. Design and validation of a high-flow personal sampler for PM 2.5. Journal of Exposure Science and Environmental Epidemiology, 2001, vol. 11, No. 1, p. 5.
Mohlmann, C., Aitken, R. J., Kenny, L. C., et al. Size-selective personal air sampling: a new approach using porous foams. Annals of Occupational Hygiene, 2002, vol. 46, No. suppl_I, pp. 386-389.
Cena, Lorenzo G., Anthony, T. Renee, et Peters, Thomas M. A personal nanoparticle respiratory deposition (NRD) sampler. Environmental science & technology, 2011, vol. 45, No. 15, pp. 6483-6490.
Supplementary Partial ESR for EP18885912, dated Nov. 19, 2020.
Hata, et al., "Development of a high-volume air sampler for nanoparticles," Environ Sci, Processes Impacts, vol. 15, No. 2, Jan. 1, 2013, pp. 454-462.

\* cited by examiner

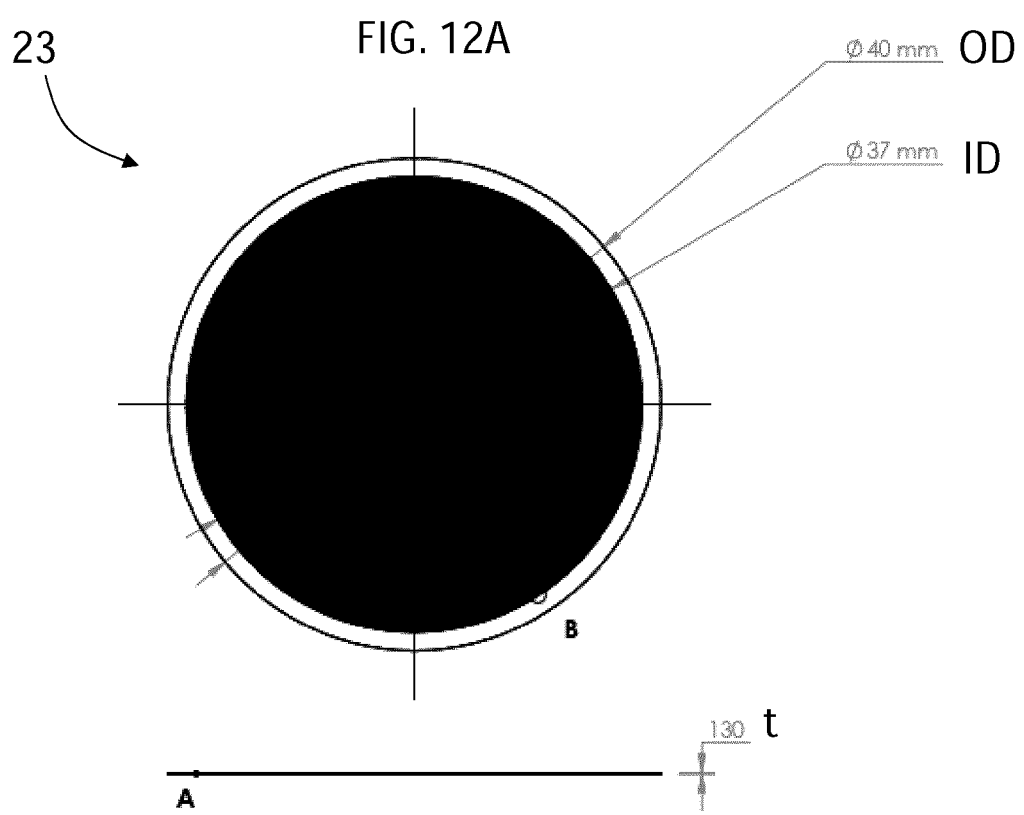

DETAIL A
SCALE 300 : 1

DETAIL B
SCALE 50 : 1

FIG. 15

FILTERS FOR MIMICKING REGIONAL LUNG DEPOSITION

RELATED APPLICATIONS

This application claims priority benefit of U.S. Provisional Application Ser. No. 62/595,641 filed 7 Dec. 2017, the contents of which are hereby incorporated by reference.

FIELD

The present disclosure generally relates to filters for aerosol sampling, and more specifically to the design and use of filters to replicate deposition in specific regions of the human respiratory tract over a range of physiologically relevant flowrates.

BACKGROUND

In the field of aerosol science, in vitro testing involves the use of physical experiments to determine various properties of aerosols. Such methods are commonly used in the early stages of product development for inhaled pharmaceutical aerosols to characterize device performance. Many have argued for improved in vitro methods that can accurately predict device performance in vivo to reduce the costs and complexities related to the drug development process (Byron, et al., 2010). Of specific interest is the prediction of the dose of drug depositing in different regions of the respiratory tract using in vitro methods.

Current standards related to quality control and regulatory compliance for inhaled pharmaceutical aerosols, such as the standard set up shown in FIG. 1, specify a number of in vitro tests for device performance (USP-NF, 2017), ranging from quantification of device delivered doses to aerodynamic particle size distribution measurements using cascade impactors for solid particles and laser diffraction for liquid particles. Because aerosol particle behavior in the respiratory tract depends heavily on particle size (Finlay, 2001), simple in vitro tests that determine only the emitted dose from a device provide little practical information for predicting regional deposition in the airways.

The determination of aerodynamic particle size distributions using cascade impactors is standard practice (Hickey, 2004). Various cascade impactor designs have been described in the literature (U.S. Pat. No. 3,795,135, 1974; U.S. Pat. No. 5,343,767, 1994; U.S. Pat. No. 6,453,758 B1, 2002). Common limitations among existing designs of cascade impactors are inter-stage losses, costs associated with operator time and solvent usage, and the requirement for operation at a constant flowrate (precluding the use of realistic inhalation patterns). Methods have been proposed to utilize mixing inlets such that a realistic inhalation profile can be delivered through an inhaler upstream of a cascade impactor while still satisfying the requirement for a constant flowrate in the impactor itself. The introduction of a mixing inlet, however, may lead to increased losses and significantly complicates experimental testing procedures. Standard practice involves the definition of a fine particle dose (or fine particle fraction), representing the portion of particles in an aerosol with a diameter below a specified limit (delineating fine and coarse particles) based on measured aerodynamic particle size distributions. Fine particles are often thought of as having a size allowing for penetration and deposition in the airways. However, as particle deposition depends on flowrate as well as particle size, this treatment masks the effects that changing flowrates over the course of an inhalation can have on respiratory tract deposition, and there is no consensus on the appropriate size range for such fine particles (Clark & Borgstrom, 2002).

Currently, to evaluate an inhaler's performance it is common to test it in a benchtop apparatus that actuates the device through a mouth-throat model (such as the Alberta Idealized Throat (AIT) or the United States Pharmacopeia (USP) induction port) and into an impactor which fractionates the aerosol by aerodynamic size. As described above, the particles collected in the impactor are indicative of those entering the lungs if the correct fraction of particles deposit in the mouth-throat model. The AIT is an example of a mouth-throat model which has been developed to closely mimic in-vivo extrathoracic deposition for inhaler testing (Grgic, Finlay, & Heenan, 2004). An estimate for regional lung deposition of the measured aerosol can be made by analyzing the mass of active ingredient on each impactor plate and applying a regional lung deposition model based on the cut-off sizes for each plate and the inhalation flow rate used to test the inhaler (e.g. Ruzycki, Martin, Vehring, & Finlay (2017)). While this approach is well established, it is not without its disadvantages. A review of these drawbacks and some steps taken in attempts to alleviate them is given by Copley (2013). Most areas for improvement can be connected back to two issues: 1) the need to operate cascade impactors at a constant flow rate, and 2) the large amount of analysis required to form a final result from the fractionated aerosol remaining in the impactor after an experiment.

Regarding the first issue, cascade impactors must be operated at a known and controlled constant flow rate to provide accurate particle sizing data. Inhaler performance is closely related to the flow rate through the device and in-vivo inhalation profiles are distinctly time varying, so to achieve useful inhaler performance data, the device should be tested with flow profiles that will be generated when it is used. In order to test inhalers using realistic inhalation profiles (with variable flow) additional equipment is required to allow the impactor to remain under constant flow. If flow rate through an impactor was varied, particles of the same size would impact on different stages of the impactor as the flow varied resulting in unknown particle sizing. Additionally, the unknown effects of transient turbulence would further obscure where particles of a distinct size should land. The cascade impactor must be operated with a constant flow, so a mixing inlet is used to allow a constant flow to be provided to the impactor while also allowing a variable flow inhalation profile to pass through the mouth-throat model and inhaler. While this is a widely used approach to test inhalers with realistic flow profiles, the basic experimental setup is complicated by additional equipment requirements and the need to control and monitor impactor flow as well as model flow.

Arguably more important is the second issue, i.e. reducing the burden of performing these tests. While additional equipment requirements are not ideal, they can be overcome relatively easily. However, the total time required to perform an inhaler test is not so easily managed. The actual physical performance of the experiment is relatively fast, however obtaining data from that experiment is not. The Next Generation Impactor (NGI) is a widely used cascade impactor for inhaler performance testing which separates the aerosol into seven size bins, each of which must be analyzed separately to determine its aerosol mass fraction in addition to the analysis of aerosol depositing in the AIT and remaining in the inhaler. Thus, the analysis of impactor samples is a large portion of the testing encumbrance. One solution to alleviate this part of the experiment is to use an impactor with fewer stages, such as an Abbreviated Impactor Measurement (AIM). Although using fewer stages reduces the resolution of the aerosol size distribution it still allows comparison of coarse, fine, and extra-fine particle fractions which may be suitable for quality control and research development purposes but does not accurately indicate in-vivo lung deposition or therapeutic outcomes.

Flowrate effects on regional lung deposition can be captured using mathematical models of deposition in the respiratory tract. One-dimensional lung deposition models using particle size and inhalation flowrate as input parameters have been developed to predict regional deposition (ICRP, 1994), and can be used in conjunction with cascade impactor measurements to predict respiratory tract deposition. However, the correlations used in mathematical models are valid only for a specified range of parameters, and most existing models prove inadequate in predicting extrathoracic deposition a priori. Fortunately, accurate measures of extrathoracic deposition can be obtained using in vitro models of the mouth-throat (e.g. the Alberta Idealized Throat, Copley Scientific). The combination of realistic mouth-throat models placed upstream of cascade impactors may provide a method for estimating regional deposition, but is still subject to the limitations associated with cascade impactor measurements and the incorporation of time-variant inhalations.

Filters provide an alternative method for classifying aerosol particles. The theory of operation for aerosol filters is described in the literature (Davies, 1973). Filters are typically designed to clean an airstream by removing as many particles as possible. For such filters, the filtering efficiency is ideally 100% for all particles, though in practice there is a most-penetrating particle size for which the filter efficiency is a minimum.

Polyurethane foam filters have been used to characterize ambient aerosols (Brown, 1980; Kuo, et al., 2005; Koehler & Volckens, 2013; Sleeth, Balthaser, Collingwood, & Larson, 2016; Tomyn, Sleeth, Thiese, & Larson, 2016; Courbon, Wrobel, & Fabries, 1988; Chung, Aitken, & Bradley, 1997; Vincent, Aitken, & Mark, 1993; Chen, Lai, Shih, & Yeh, 1998). Empirical models describing the penetration of particles through such filters are available and known in the art (Clark, Koehler, & Volckens, 2009). Such models have been used in the development of ambient aerosol samplers that attempt to replicate respiratory tract deposition based on the various deposition models. The state of the art involves the replication of ICRP (ICRP, 1994) deposition efficiency curves for extrathoracic, tracheobronchial, and alveolar deposition (Koehler & Volckens, 2013). The current art advocates the use of constant flowrates, precluding the use of time variant inhalation profiles, and relies on mathematical models to model extrathoracic deposition efficiency curves. These limitations prevent the use of such filters in characterizing therapeutic aerosols delivered from inhalation devices, as time-variant inhalation profiles and complicated deposition behavior in the extrathoracic region are observed when using such devices.

Koehler & Volckens (2013) proposed a multistage sampler intended to mimic extrathoracic, tracheobronchial, and alveolar deposition as estimated using the ICRP 1994 regional deposition model. This sampler operates at a constant flow rate of 16.7 L/min so does not enable simple testing of inhalers under normal inhalation patterns. Additionally, the filtration elements of their device are polyurethane foam substrates and nylon mesh screens, which tend to interfere with quantification of pharmaceutical ingredients especially with some solvents, particularly when assaying small quantities. Nylon is also hygroscopic, which may result in humidity dependent behaviour, especially if using gravimetric methods.

An exact description of the deposition of aerosol in the lungs remains an elusive objective, however many fruitful attempts have been made to describe parts of the overall system. Quantification of aerosol deposition in the lungs is made difficult by the very small size of many of the airways, which makes deposition measurement in realistic models difficult. The very large number of airways also makes it difficult both to simulate deposition and to validate with experimental measurements. In-vivo measurements have been made in the past using radio-labelled aerosol to measure regional (and total) deposition in the lungs. Using this technique, regional deposition can be classified by clearance rate in the lung. Fast cleared aerosol (often defined as aerosol cleared from the lungs within 24 hours) is assumed to deposit in the tracheobronchial region where ciliary clearance is known to be the dominant aerosol clearance mechanism. This mechanism is not at work in the alveolar region due to the non-existence of ciliated epithelium in this region, however it has been suggested that clearance rates alone cannot be used to define regional deposition (Stahlhofen, Rudolf, & James, 1989). With advances in medical imaging techniques, attempts have been made to separate lung deposition into central and periphery regions but identifying tracheobronchial vs. alveolar regions in this method is not possible due to the overlap of the regions when projecting the three-dimensional lung into a two-dimensional plane. Higher resolution imaging techniques may be able to produce a closer estimate of regional deposition efficiencies; however, these measurements are not commonly performed due to the health risks associated with the radiation exposure necessary to produce the images.

Despite these difficulties, multiple regional deposition models have been proposed to describe expected average tracheobronchial deposition, most often in an average adult male subject. Each model differs in its conception and thus in its estimate of deposition efficiencies resulting in a range of acceptable filtration efficiencies for us to target. An example of the range of expected deposition based on each tracheobronchial deposition model are shown in FIG. 2. These models provide a target range for filtration for inhalation flow rates ranging from 15 to 90 L/min.

Accordingly, there remains a need in the art for a filter capable of replicating regional deposition efficiencies in specific regions of the human respiratory tract over a range of physiologically relevant flowrates to streamline inhaler testing by simplifying experiments and reducing the amount of manual labor and post processing while maintaining the highly repeatable nature of the experiments without introducing additional complexities or uncertainties.

SUMMARY

A filter for mimicking regional lung deposition is provided that includes a plurality of filter layers of fibrous filter material stacked coaxially and an outer ring portion encircling the fibrous filter material and securing the plurality of filter layers together. The fibrous filter material is formed for fibers having a fiber diameter, and the filter has a tunable filter efficiency.

A filter for aerosol particle deposition sampling is provided that includes several filter layers of fibrous filter material stacked coaxially, the fibrous filter material being formed from fibers. The fibrous filter material includes fibers each with a fiber diameter. An outer ring portion encircling the fibrous filter material and securing the filter layers and having filter having a filter efficiency (E). The efficiency E can be defined as $$E = 1 - \exp\left(\frac{-4\alpha E_\Sigma t}{\pi d_f}\right)$$

at $d_f E_\Sigma$ $E_\Sigma = E_I + E_R + E_D + E_{DR} + E_G$ where is a volume fraction of fibers, is a thickness of the filter, is the fiber diameter, and is a single fiber deposition efficiency. The single fiber deposition efficiency can be equal to $$at d_f E_\Sigma$$

$$E_I E_R E_D E_{DR} E_G E_I = \frac{(Stk)J}{2Ku^2}$$

where is deposition due to impaction, is deposition due to interception, is deposition due to diffusion, is deposition due to interception of diffusing particles, and is deposition due to gravitational settling. The deposition due to impaction can be set equal to $$E_I E_R E_D E_{DR} E_G$$

where Stk is a particle Stokes number, Ku is a Kuwabara hydrodynamic factor, and J is a factor accounting for filter properties. The particle Stoke number can be set equal to $$Stk = \frac{\tau U_0}{d_f}$$

where $\tau$ is a particle relaxation time, $U_0$ is a face velocity, and $d_f$ is the fiber diameter. The Kuwabara hydrodynamic factor can be set equal to $$Ku = -\frac{\ln \alpha}{2} - \frac{3}{4} + \alpha - \frac{\alpha^2}{4}$$

where $\alpha$ is the volume fraction of fibers. The factor accounting for filter properties is equal to $$J = (29.6 - 28\alpha^{0.62})R - 27,5R^{2.8}$$

where R is a ratio of particle diameter to fiber diameter and $\alpha$ is the volume fraction of fibers. In some inventive embodiments R is less than 0.4. In other inventive embodiments J is 2.0. The deposition due to interception can be set equal to $$E_R = \frac{(1-\alpha)R^2}{Ku(1+R)}$$

where R is the ratio of particle diameter to fiber diameter, $\alpha$ is the volume fraction of fibers, and Ku is a Kuwabara hydrodynamic factor. In some inventive embodiments, the deposition due to diffusion can be set equal to $$E_D = 2Pe^{-2/3}$$

where Pe is a Peclet number. In some inventive embodiments, the Peclet number can be set equal to $$Pe = \frac{d_f U_0}{D}$$

where $U_0$ is a face velocity, $d_f$ is the fiber diameter, and D is a particle diffusion coefficient. In some inventive embodiments, the deposition due to interception of diffusing particles can be set equal to $$E_{DR} = \frac{1.24 R^{2/3}}{(Ku\, Pe)^{1/2}}$$

wherein R is a ratio of particle diameter to fiber diameter, Ku is a Kuwabara hydrodynamic factor, and Pe is a Peclet number. In some inventive embodiments, the deposition due to gravitational settling can be set equal to $$E_G = G(1+R)$$

where G is a ratio of settling velocity to face velocity, and R is fiber diameter.

The present disclosure also provides a regional lung deposition system capable of measuring constant flow or variable flow that includes a throat simulation device, a filter housing downstream of and in fluid communication with the throat simulation device, a breath simulator downstream of and in fluid communication with the filter housing, and a an above-referenced filter positioned within the filter housing downstream of the throat simulation device and upstream of the breath simulator. A regional lung deposition system in some embodiments includes a throat simulation device, a filter housing downstream of and in fluid communication with the throat simulation device, a breath simulator downstream of and in fluid communication with the filter housing; and a first aforementioned filter positioned within the filter housing downstream of the throat simulation device and upstream of the breath simulator. In some inventive embodiments, a second of the aforementioned filters is provided within the filter housing downstream of the first filter and upstream of the breath simulator. In some inventive embodiments, the throat simulator device is an Alberta Idealized Throat or mimics aerosol deposition in an extrathoracic region of a subject. In some inventive embodiments, the first filter mimics aerosol deposition in a tracheobronchial region of a subject while in others the second filter mimics aerosol deposition in an alveolar region of a subject.

The present disclosure further provides a filter housing for use in the regional lung deposition system that includes a conical housing having a small inner diameter at a first end and a large inner diameter at a second end.

A filter housing for use in the aforementioned regional lung deposition system includes a conical housing having a small inner diameter at a first end and a large inner diameter at a second end. In some inventive embodiment, shims configured to separate the filter layers of filter are also provided. In still other inventive embodiments a collar is provided that is configured to hold the filter in place within the filter housing.

BRIEF DESCRIPTION OF THE DRAWINGS

The present disclosure is further detailed with respect to the following drawings that arc intended to show certain aspects of the present of disclosure, but should not be construed as limit on the practice of the disclosure, wherein:

FIG. 12A is a top view of the filter layer of FIG. 11;

FIG. 12B is a side view of the filter layer of FIG. 11;

FIG. 15 is a schematic drawing of an embodiment of a filtration measurement apparatus able to measure constant flow or variable flow by using either the vacuum pump or breath simulator to generate flow through the model;

F chial filter mimic downstream of a mouth-throat geometry (e.g. the AIT), but upstream of an absolute filter, regional deposition in the respiratory tract is then approximated simply by assaying amounts depositing in the model mouth-throat, the tracheobronchial filter mimic, and the final absolute filter. Due to breath holding, for many inhalers any aerosol exiting the tracheobronchial region is captured in the alveolar region, so that a final absolute filter then is an approximation to alveolar deposition.

In order to maintain the integrity of inhaler performance testing, the developed tracheobronchial filter mimic is highly repeatable and does not interfere with the detection of the active ingredient collected on the filter. It is also durable, reasonably sized, and easy to work with.

Furthermore, the filtration efficiency of the tracheobronchial filter mimics that of expected in-vivo tracheobronchial deposition efficiency curves and emulates the average deposition efficiency of the tracheobronchial region of the lungs over the range of physiological inhalation flow rates. To achieve this, the properties of the filter that govern its filtration are carefully chosen. These properties include the filter fibre diameter, df, the filter face diameter, D, and the density of the filter, α or N. Single fibre filter theory and computational fluid dynamics (CFD) were used to identify suitable combinations of these properties which were then built and their filtration efficiencies evaluated.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Using equations governing the theory of deposition of particles in filters and the respiratory tract a filter 20 with properties able to mimic deposition in different regions of the respiratory tract is provided. According to embodiments of the present disclosure, the inventive filters 20 mimic deposition in different regions of the human respiratory tract over the wide range of flow rates, such as those seen during inhalation from an inhaler, where the flow rate starts at zero, reaches a maximum and then decreases until inhalation stops at the end of a breath. Filters 20 of the present disclosure approximately match curves of in vivo tracheobronchial deposition versus particle size for the range of typical flow rates expected in vivo, as seen in FIGS. 4A-4D.

Figure 8:
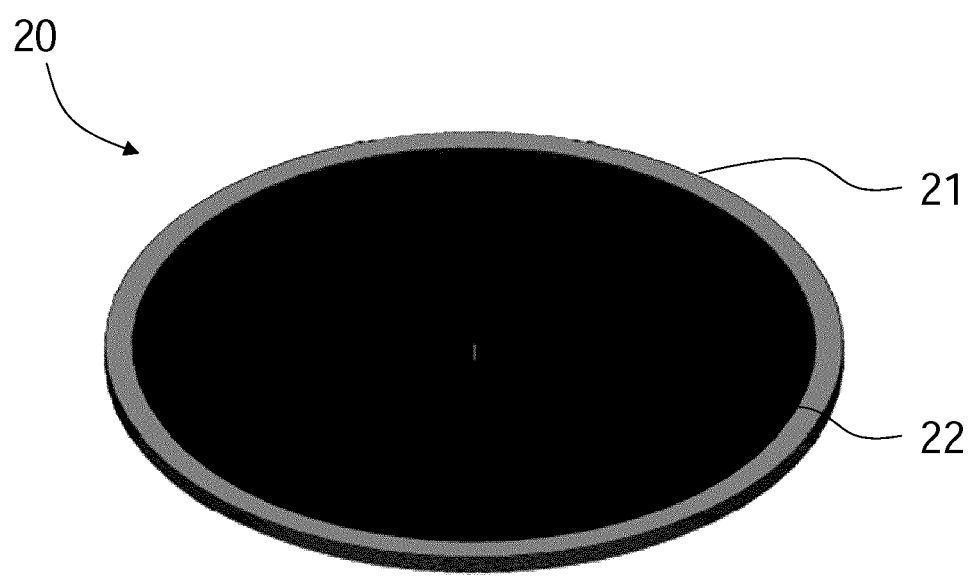
FIG. 8 is a perspective view of a filter according to a form of the present disclosure.
Figure 9:
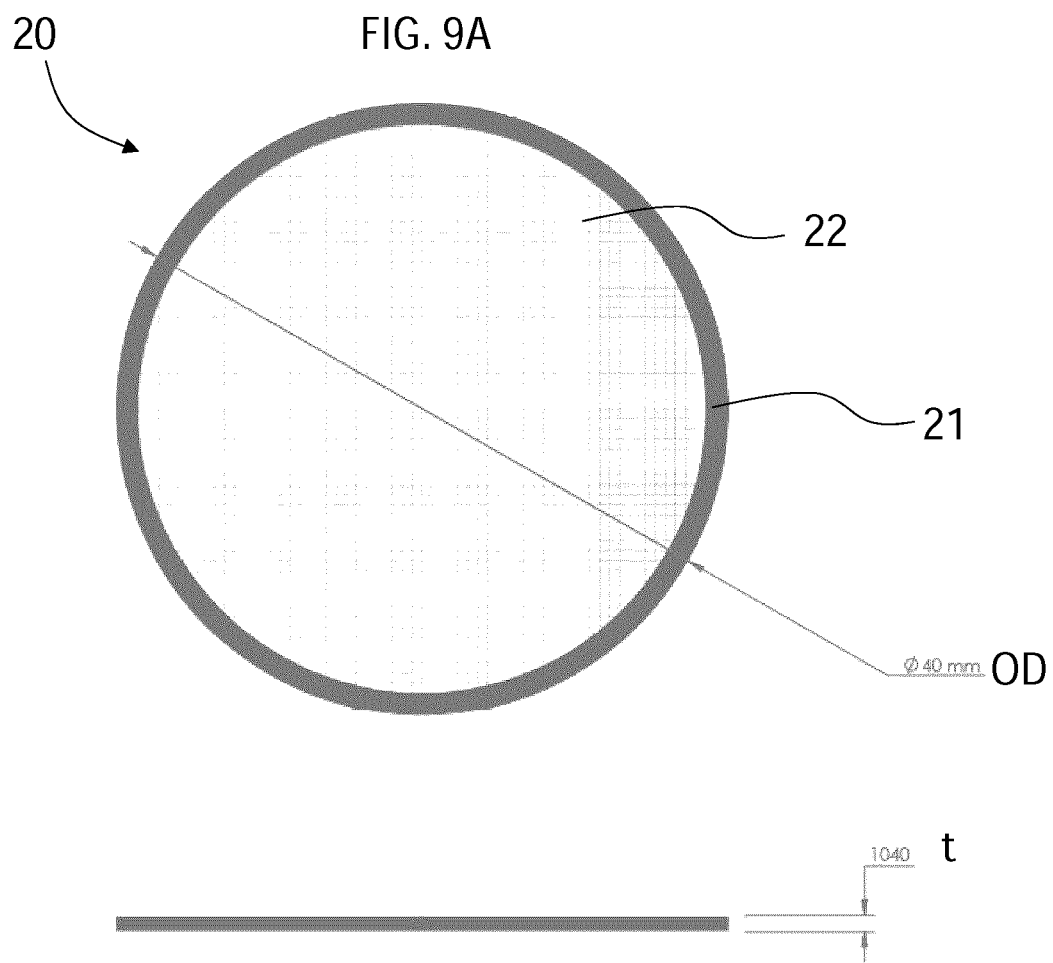
FIG. 9A is a top view of the filter of FIG. 8.
FIG. 9B is a side view of the filter of FIG. 8.
Figure 10:
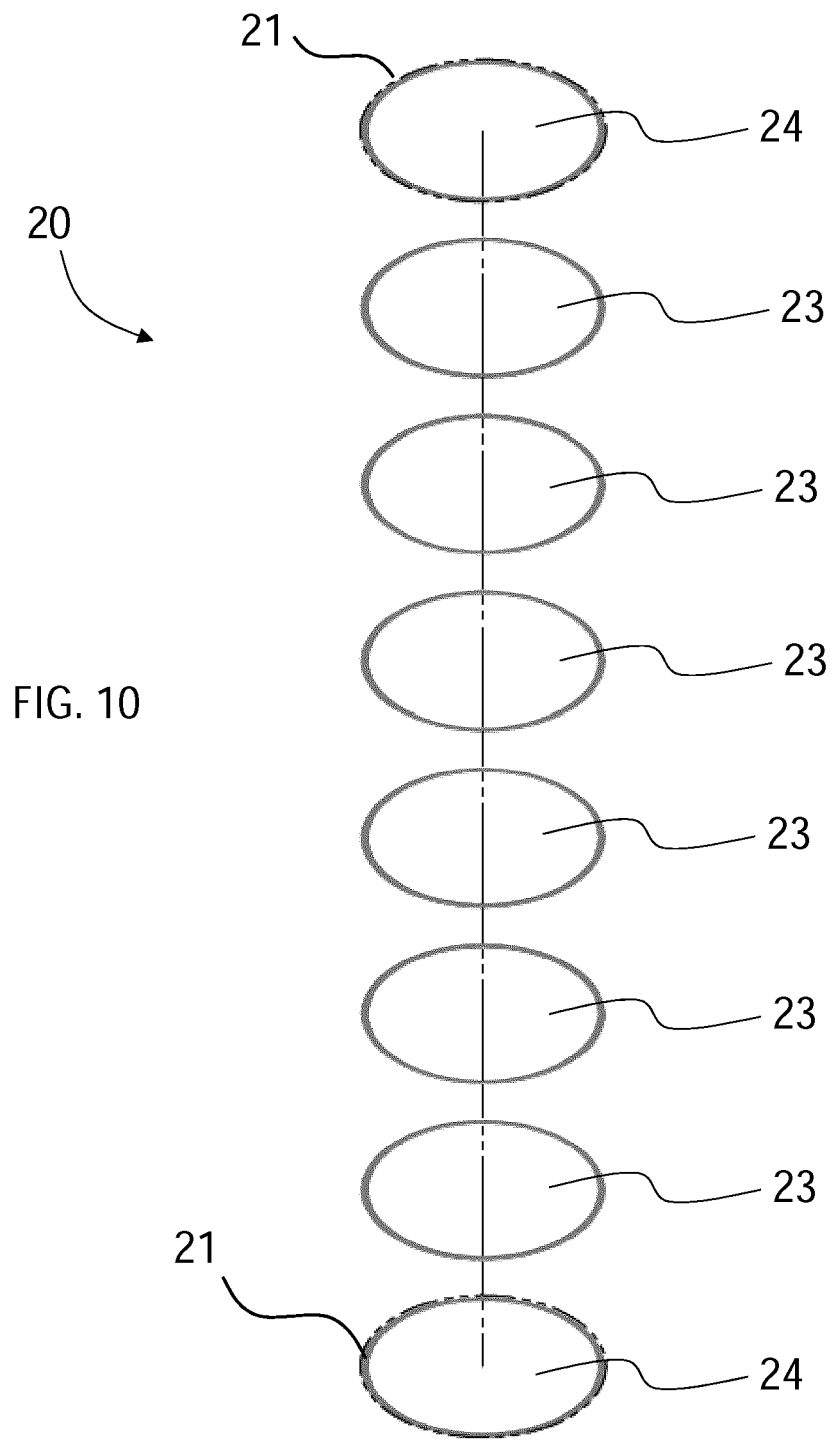
FIG. 10 is an exploded perspective view showing filter layers of the filter of FIG. 8.
Figure 11:
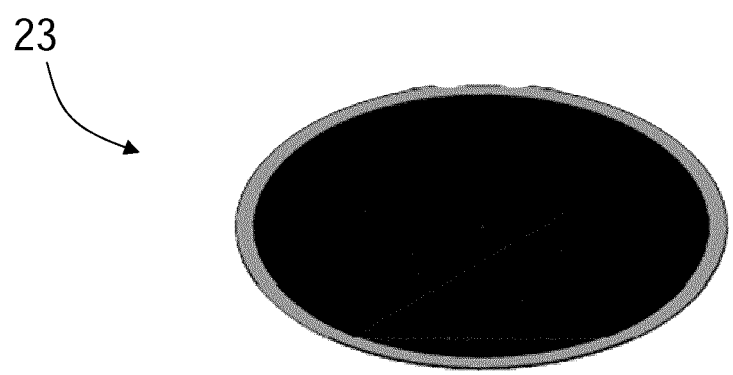
FIG. 11 is a perspective view of a filter layer according to a form of the present disclosure.
Figure 13A:
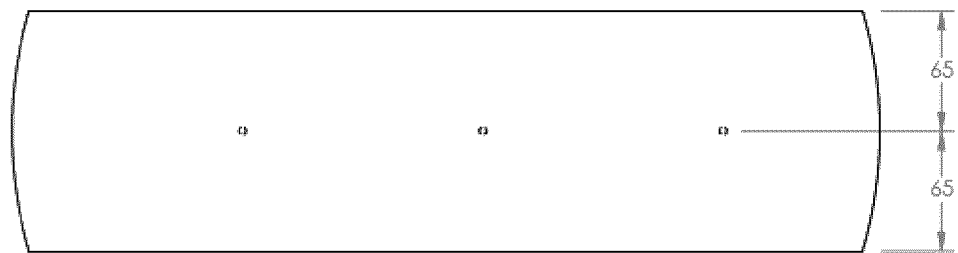
FIG. 13A is a side detail view of the filter layer of FIG. 11.
Figure 13B:
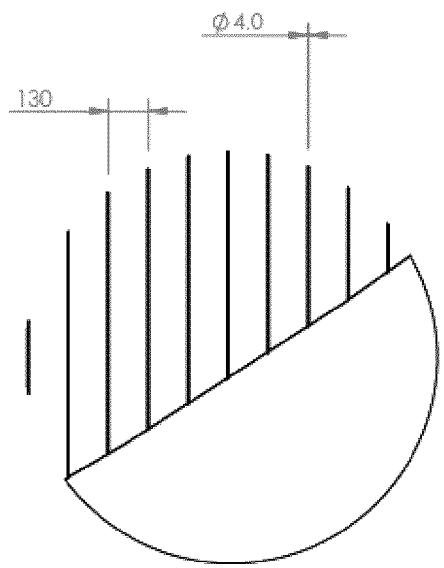
FIG. 13B is a top detail view of the filter layer of FIG. 11.

Filters 20 according to the present disclosure, such as that shown in FIG. 8, are designed based on various deposition mechanisms included in the calculation of filtration efficiency, including impaction, diffusion, gravitational deposition, and interception. As shown in FIG. 8, the filter 20 includes an outer ring portion 21 and a fibrous portion 22. As best shown in FIGS. 9A and 9B, the filter 20 has an outer diameter OD, measuring from the outer edges of the outer ring portion 21. The filter 20 of FIG. 9A has an outer diameter of 40 mm, however, it will be understood that the diameter of the filter 20 may vary based on design parameters for a given test system. As shown in FIG. 9B, the filter 20 also has a thickness T. The outer ring portion 21 and the fibrous portion 22 may be differing thicknesses. As shown in FIG. 10, the thickness of the filter 10 is made up of a plurality of filter layers 23. According to some embodiments, the top and bottom filter layers 24, that is the outer most filter layers of the filter 20, include the outer ring portion 21. These outer ring portions 21 are formed of plastic of metal materials. The outer ring portions 21 of the filter layers 23 snap together or may be joined together to hold the plurality of filter layers 23 in a staked relationship to form the filter 20. FIG. 11 shows a filter layer 23. FIGS. 12A and 12B show further details of a filter layer 23 including an outer diameter OD, inner diameter ID measured from the outer edges of the fibrous portion 22, and a thickness t. The thickness t of the filter layer 23 is smaller than the thickness T of the filter 20.

Figure 6:
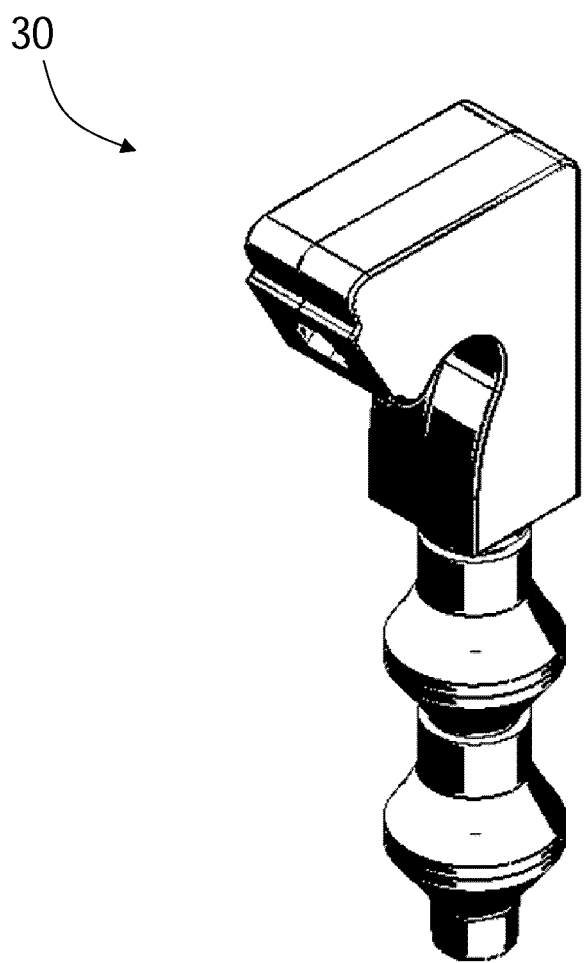
FIG. 6 is a perspective view of a regional lung deposition system according to a form of the present disclosure.
Figure 7:
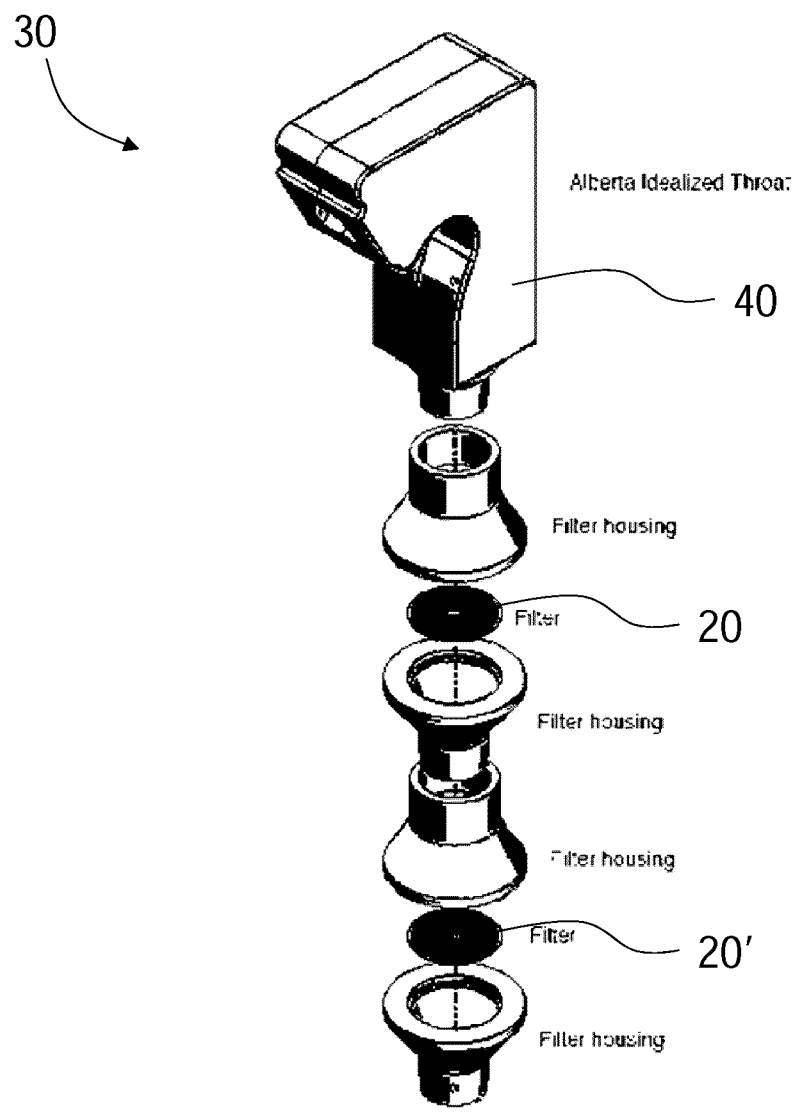
FIG. 7 is an exploded perspective view of the regional lung deposition system of FIG. 4.

FIGS. 6 and 7 show a form of a region lung deposition system 30 according to an embodiment of the present disclosure. With a single filter able to mimic tracheobronchial deposition over such a wide range of flow rates, one embodiment, such as that shown in FIGS. 6 and 7, involves placing a filter 20, with similar physical properties to that shown in FIGS. 4A-4D, downstream of the Alberta Idealized Throat 40 (or other geometry that accurately mimics deposition in the extrathoracic region), with a second filter 20' downstream of the first filter 20 and finally, a breath simulator (not shown) downstream of the second filter 20'. In this way, deposition in the extrathoracic deposition is captured by the throat model, while tracheobronchial deposition is captured by the first filter 20. Since many inhaled pharmaceutical aerosols are used with a breath hold, aerosol not depositing in the extrathoracic and tracheobronchial regions will deposit in the alveolar region. Thus, by adding a second filter 20' (downstream of the first filter) that captures all aerosol penetrating the throat model and first filter 20, the second filter 20' approximates alveolar deposition. By using this set up with a breath simulator downstream of the throat and two filters, realistic time varying inhalation profiles obtained from patients using a given inhaler can be used to determine extrathoracic, tracheobronchial and alveolar deposition by assaying drug depositing in the throat, first filter 20 and second filter 20', respectively. Accordingly, a single carefully designed filter is able to match in vivo tracheobronchial deposition over a wide range of flow rates. This result allows the above set up to provide estimates of regional lung deposition from an inhaler with realistic patient breathing patterns with considerably less effort than the existing approaches noted earlier.

Important filter properties for fibrous filters include the volume fraction of fibers α, the fiber diameter $d_f$, the filter thickness t, and the single fiber deposition efficiency $E_\Sigma$. $E_\Sigma$ represents a deposition fraction per unit length of fiber and is a function of multiple mechanisms. The efficiency of a fibrous filter, E, can be calculated according to Equation 1, given knowledge of the above parameters.

$$E = 1 - \exp\left(\frac{-4\alpha E_\Sigma t}{\pi d_f}\right) \qquad \text{Equation 1}$$

The focus of single-fiber theory involves characterizing the single-fiber deposition efficiency $E_\Sigma$. Various expressions are available in the literature for a number of mechanisms, the most commonly used of which are summarized by Hinds (1999). Deposition due to impaction $E_I$, caused by the inertia of a particle leading to deviation from fluid streamlines near the fiber surface, is given as a function of particle Stokes number Stk, the Kuwabara hydrodynamic factor Ku, and a factor J accounting for filter properties, as calculated by Equation 2.

$$E_I = \frac{(Stk)J}{2Ku^2} \qquad \text{Equation 2}$$

The particle Stokes number (Stk) can be expressed in terms of the particle relaxation time $\tau$, the face velocity $U_0$, and the fiber diameter, as calculated by Equation 3.

$$Stk = \frac{\tau U_0}{d_f} \qquad \text{Equation 3}$$

The Kuwabara hydrodynamic factor is a function of fiber volume fraction, as calculated by Equation 4.

$$Ku = -\frac{\ln \alpha}{2} - \frac{3}{4} + \alpha - \frac{\alpha^2}{4} \qquad \text{Equation 4}$$

The factor J is a function of the ratio of particle diameter to fiber diameter, R and the fiber volume fraction, as calculated by Equation 5.

$$J = (29.6 - 28\alpha^{0.62})R - 27.5R^{2.8} \qquad \text{Equation 5:}$$

This expression is valid for R<0.4. An approximate value of J=2.0 is be used when R exceeds this value.

Interception occurs when a particle following a streamline comes close enough to a fiber such that the particle's radius causes it to deposit. As such, it is a consequence of the finite size of particles. Deposition due to interception $E_R$ can be estimated according to Equation 6.

$$E_R = \frac{(1-\alpha)R^2}{Ku(1+R)} \qquad \text{Equation 6}$$

Deposition due to diffusion $E_D$ occurs when small particles collide with filter fibers through stochastic random motion. Deposition due to diffusion $E_D$ is calculated according to Equation 7.

$$E_D = 2Pe^{-2/3} \qquad \text{Equation 7}$$

Pe is the Peclet number, whose value depends on the particle diffusion coefficient D and is calculated according to Equation 8:

$$Pe = \frac{d_f U_0}{D} \qquad \text{Equation 8}$$

An additional deposition mechanism accounts for the interception of diffusing particles and is calculated according to Equation 9.

$$E_{DR} = \frac{1.24 R^{2/3}}{(Ku\ Pe)^{1/2}} \qquad \text{Equation 9}$$

Deposition due to gravitational settling $E_G$ depends on the orientation of the airflow relative to gravity. In situations in which the flow velocity and the settling velocity are in the same direction, $E_G$ is expressed according to Equation 10.

$$E_G = G(1+R) \qquad \text{Equation 10}$$

Here, G is the ratio of settling velocity to face velocity according to Equation 11.

$$G = \frac{V_{TS}}{U_0} \qquad \text{Equation 11}$$

The overall filtration efficiency $E_\Sigma$ can be approximated by a summation of the above mechanisms according to Equation 12.

$$E_\Sigma = E_I + E_R + E_D + E_{DR} + E_G \qquad \text{Equation 12:}$$

Control of fiber diameter, face velocity, filter thickness, and fiber volume fraction allow for the design of filters that replicate deposition in various regions of the respiratory tract.

Classical filter theory [see e.g. Dunnett (2014) or Hinds (1982)] is used as an initial exploratory guide for developing filters of the present disclosure. Multiple iterations of prototype filters were built, and a number of simplifying assumptions were made to expedite the analysis. These assumptions include neglecting filtration effects due to electrostatics, gravitational settling, and diffusion. Diffusion effects are neglected given that the particles are larger than 0.1 µm in diameter; gravitational effects are neglected since the filter is operated in a vertical orientation and face velocity is expected to generally be faster than 0.1 m/s (Dunnett, 2014; Hinds, 1982). Similarly, electrostatic effects are more prevalent when the convective velocity is low relative to the drift velocity due to electrostatic forces and it is anticipated that the convective velocities are dominant. Thus, only filtration due to impaction and interception are considered when selecting filter parameters. Single fibre efficiency equations for impaction and interception defined in Dunnett (2014) and Hinds (1982) and combinations thereof are investigated and point to values of the filter parameters which are not easily manufactured e.g. solidity ($\alpha$) on the order of 0.001 (for which equations 5.26 in Dunnett (2014) and 9.22 in Hinds (1982) are not defined).

Additionally, the filter efficiency models of Nguyen & Beeckmans (1975) for 'model filters' composed of layered metal meshes are explored. Although this model was developed for N=325 mesh and 250 mesh (where N is the number of wires or openings per inch in both x and y directions) having 30 µm and 43 µm diameter wires respectively, it is extrapolated to other meshes to guide the development of the present invention. This model uses empirical modifications to the single fibre impaction efficiency equation of Landahl & Herrmann (1949) and geometrical considerations in the mat efficiency equation similar to that of Stenhouse, Harrop, & Freshwater (1970). Use of this model suggests the filter should consist of seven layers of 500×0.0008" (20 µm) mesh (N×$d_f$) with a 40 mm face diameter ($D_f$) spaced at 0.012" (0.305 mm) in order to provide the necessary filtration efficiency curves. It must be noted that this solution contains three parameters whose values are extrapolated outside the range for which the model was developed: first, the wire diameter is smaller; second, the number of wires is larger; and third, the spacing between layers was not equal to the spacing between wires and so the filter solidity is drastically reduced. These extrapolations result in inaccurate estimation of the filter efficiency curves; ultimately the filtration of this solution was too high and varied too much with flow rate compared with experiments described below. The results based on this model led to the development of an inventive model based on the efficiencies of single layers of different meshes as measured through physical experiments and simulated with Computational Fluid Dynamics (CFD).

Figure 1:
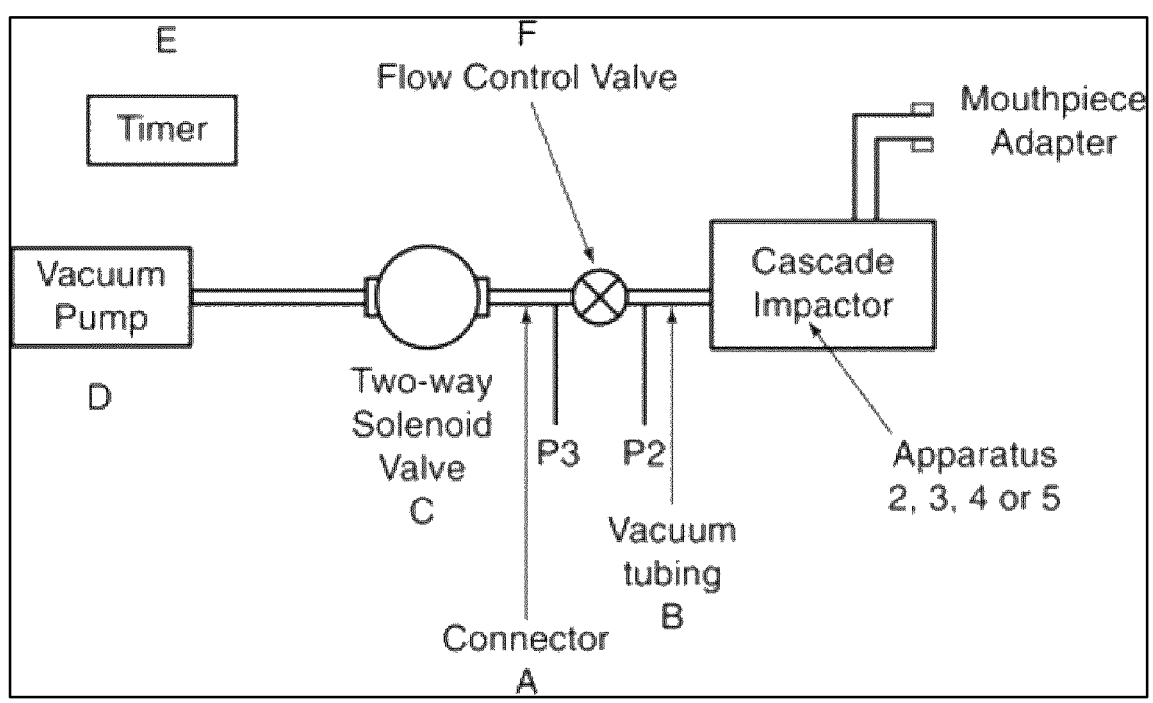
FIG. 1 is a sketch showing the standard setup used for cascade impactor measurements of inhalation products according to standard (USP-NF, 2017)
Figure 2:
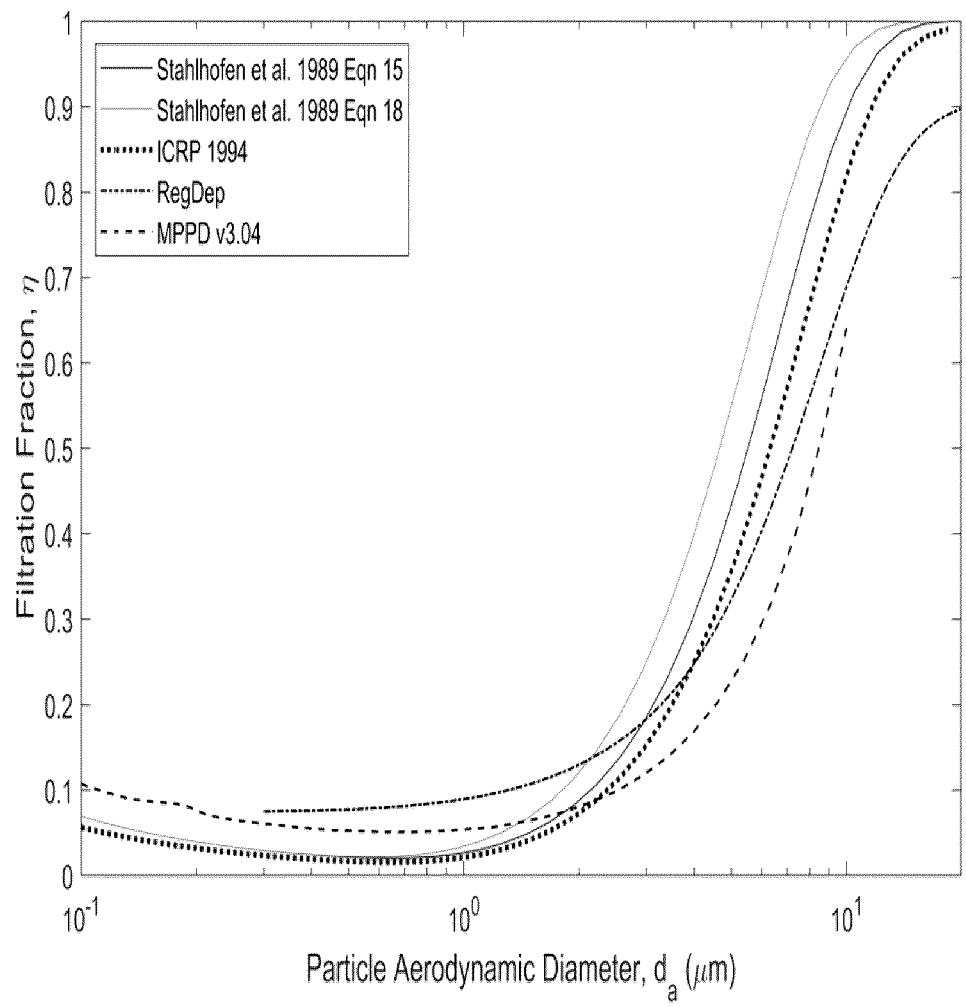
FIG. 2 is a graph showing variation in tracheobronchial deposition models calculated for a breath having an average inhalation flow rate of 30 L/min and tidal volume of 1 L.
Figure 3:
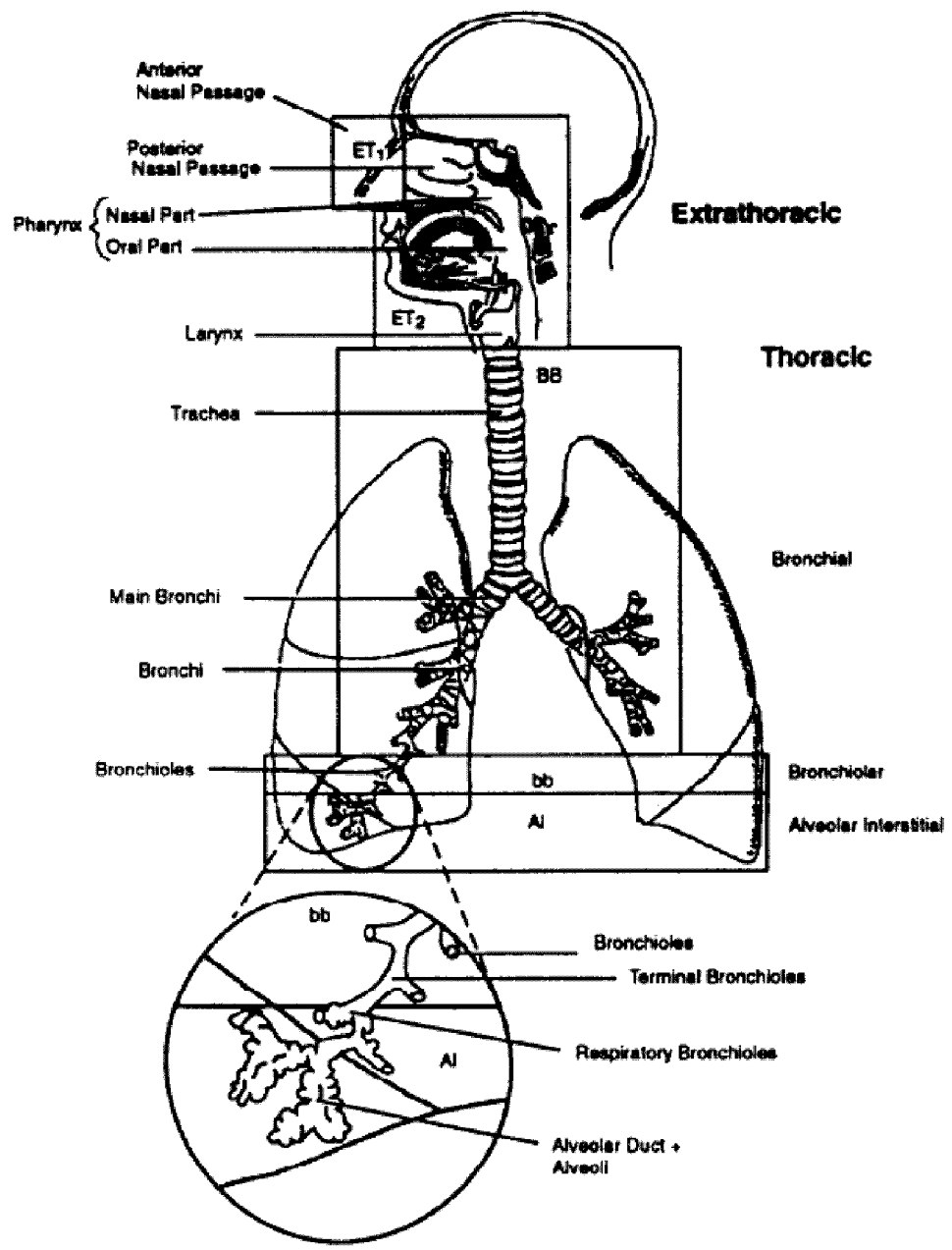
FIG. 3 is a diagram showing the anatomical regions of the human respiratory tract.
Figure 4A:
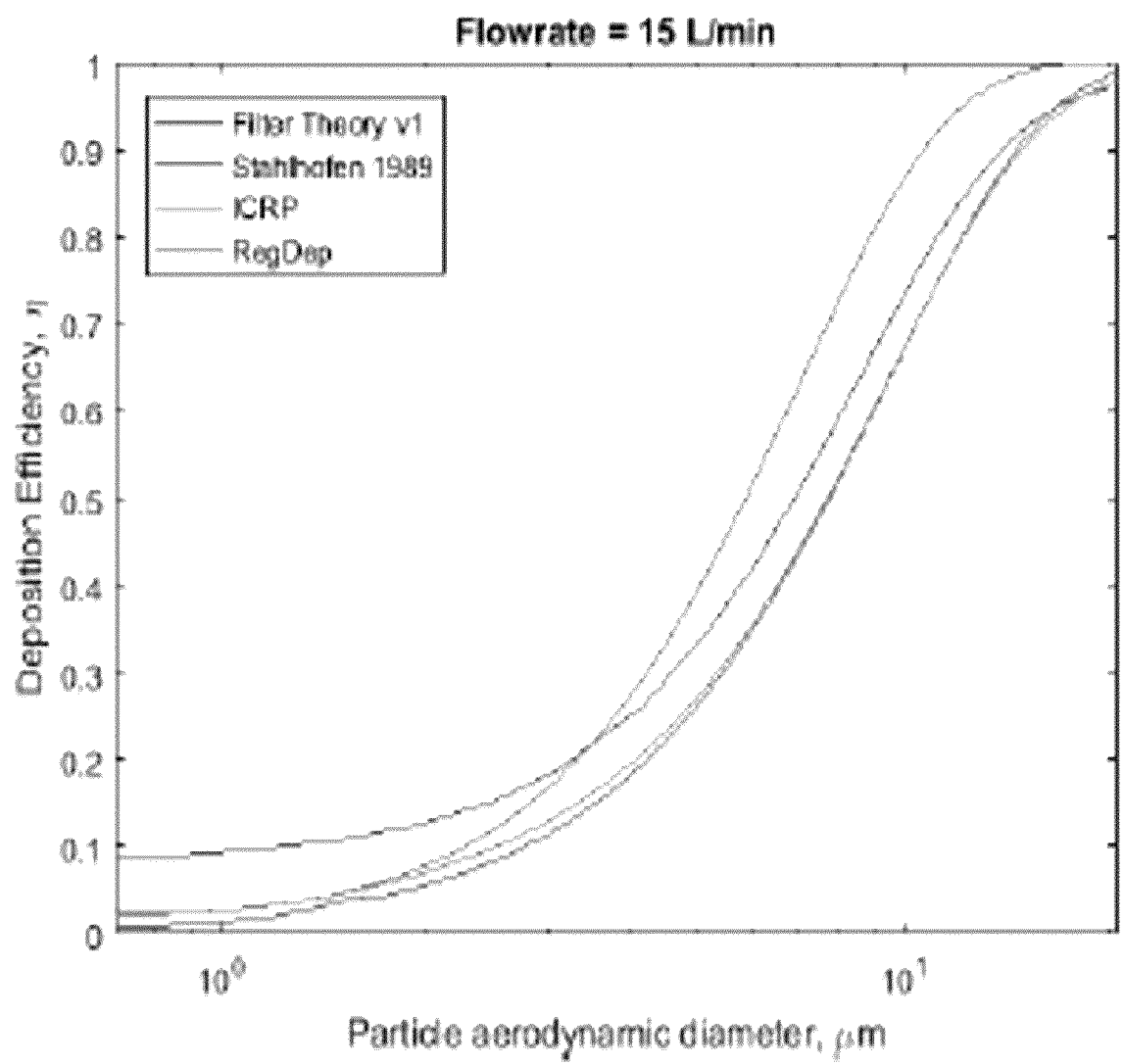
FIGS. 4A-4D are graphs showing deposition in the tracheobronchial region (red lines are from a correlation based on in vivo data, yellow and purple lines are average predicted values from mathematical models) compared with predicted deposition with a filter having fiber diameter 4 micrometers, 99.9% void fraction, thickness of 1 mm, and an area of 10.8 cm$^2$ (blue line)
Figure 4B:
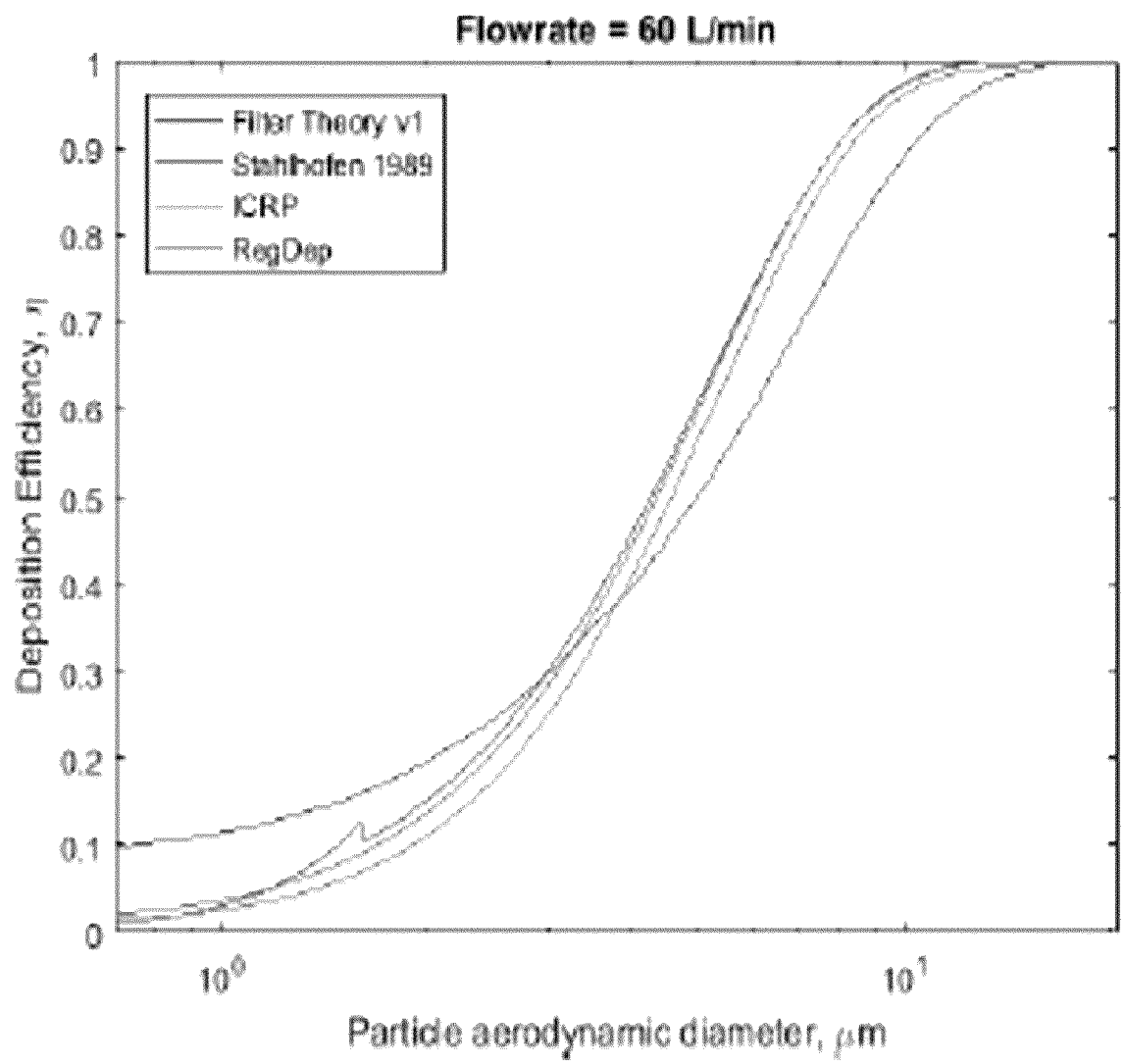
Figure 4C:
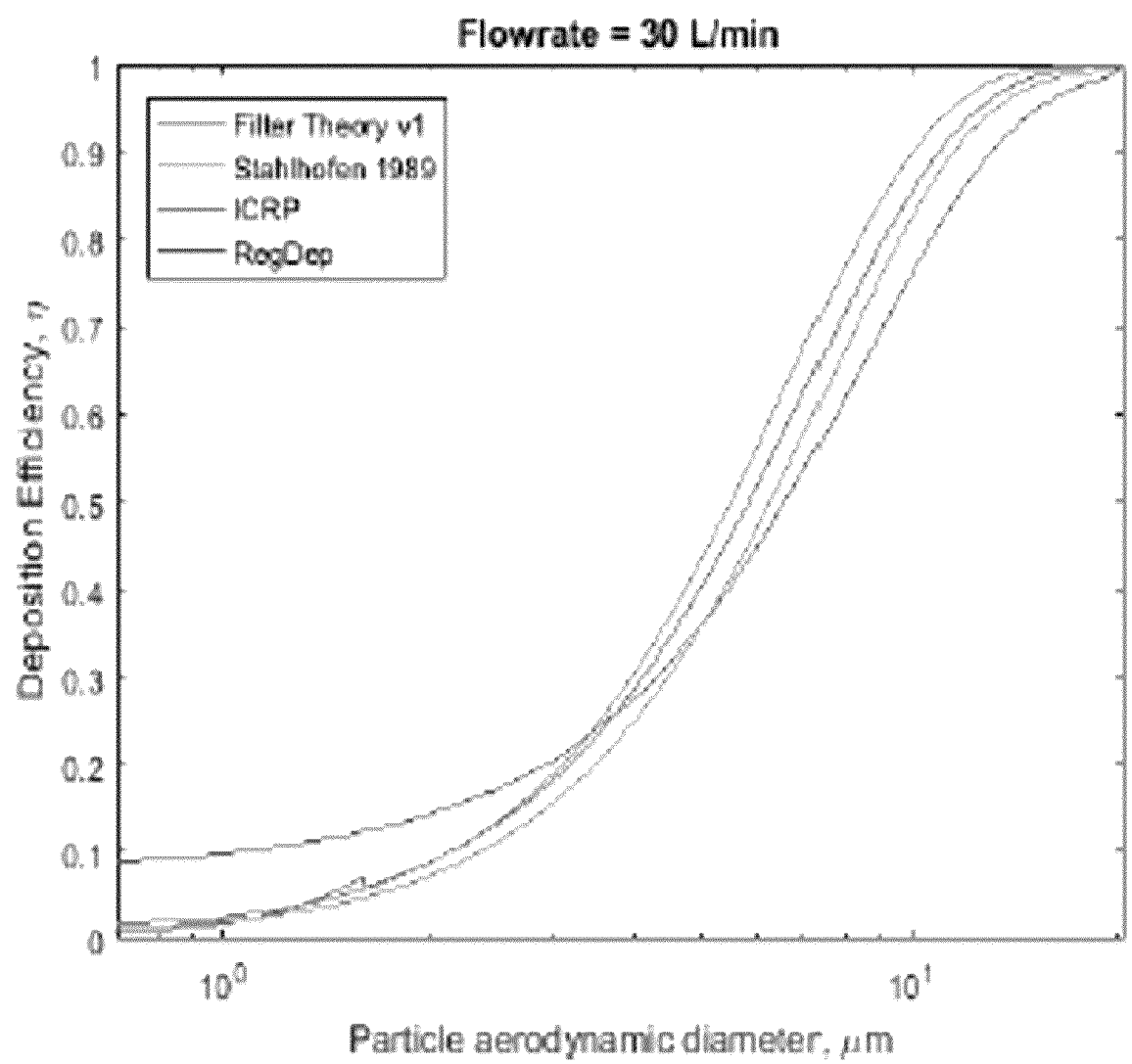
Figure 4D:
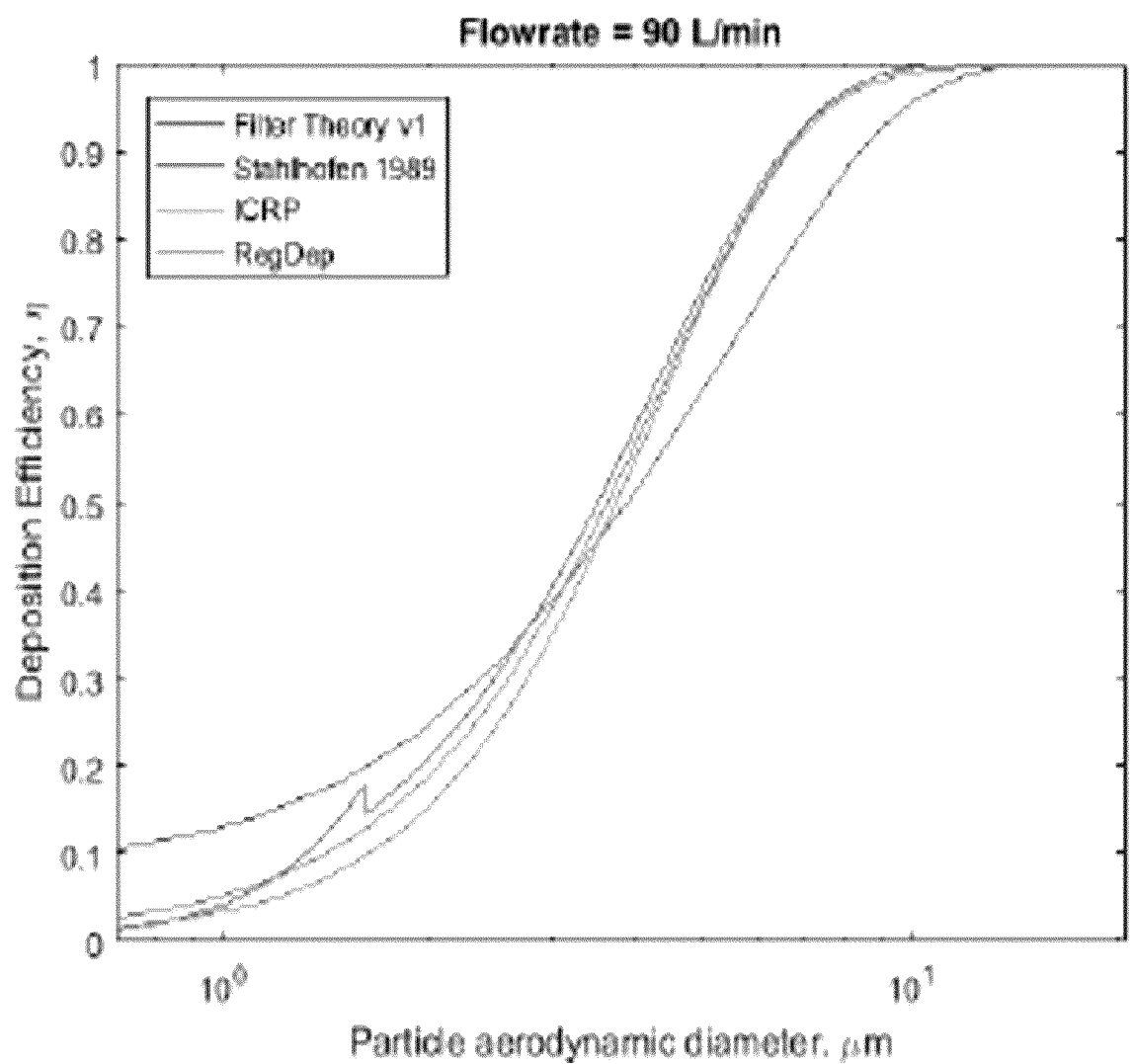
Figure 5:
FIG. 5 is a perspective view of an example of a wire obstacle STL file used to simulate mesh filtration, in this example the cylinder diameter is 0.0008 inch (0.20 mm) and the distance between parallel cylinder axis is 1/500 of an inch making a 500 mesh×0.0008 (inch wire diameter) (0.20 mm) mesh (image is not to scale)

A predictive model is developed for developing the inventive filter by simulating the filtration of a single cell of three different wire meshes using the OpenFOAM CFD Package (v5.0, Bracknell, Berkshire, United Kingdom). Filtration is simulated under constant flow conditions to simplify the simulation. Note that the term mesh here refers to the wire meshes and should not be confused with the discretization of the simulation domain. The three wire meshes for which filtration is simulated are: 500×0.0008", 400×0.0011", and 325×0.0011". The domain is a long channel with a square cross section of edge length equal to the wire spacing of the wire mesh in question. At the center of the length of the channel four half-cylinders, representing the wires of the mesh, intersect each other at the corners of the channel. The widths of the channels range from 50.8 µm to 78.2 µm depending on the wire mesh being simulated and are 1000 µm in length. The wire obstacle geometries are created in SOLIDWORKS (SOLIDWORKS 2016, Dassault Systèmes, Vélizy-Villacoublay, France) and converted to STL files using Gmsh version 3.0.6 (Geuzaine & Remade, 2009), an example of which is shown in FIG. 5. The domain is discretized using snappy HexMesh with surface-based refinement at all surfaces and boundaries. Inlet conditions are uniform velocity and zero pressure gradient, outlet conditions are zero velocity gradient and uniform pressure, the walls of the domain are treated as symmetry planes with slip conditions for velocity and pressure, and the wires are given a no-slip boundary condition with fixed value of zero velocity and zero pressure gradient. Particles are assumed not to influence the flow solution so the two solutions are calculated independently. The fluid solution is calculated for velocities from 0.05 m/s to 1.55 m/s at each 0.05 m/s interval.

After calculating each fluid solution, the particle tracking case is performed by introducing 10,000 particles distributed across the inlet and tracking them through the domain. If a particle's center comes within one particle radius of the wire mesh it is considered to have deposited and is removed from the domain. Filtration is calculated as the number of particles removed by the wire obstacle divided by the number of particles introduced to the domain. Particle sizes considered include 0.53, 0.83, 1.34, 2.12, 3.34, 5.54, 6, 7, 8, 9, and 10 µm; particle tracking is performed for each particle size independently. The first six particle sizes correspond to the geometric centers of the particle concentration bins for which the experimental filtration data described herein is available to validate the CFD model, while the remaining five particle sizes provide insight into how the filter performs for even smaller particles.

Experimental Filtration Measurements

Figure 14:
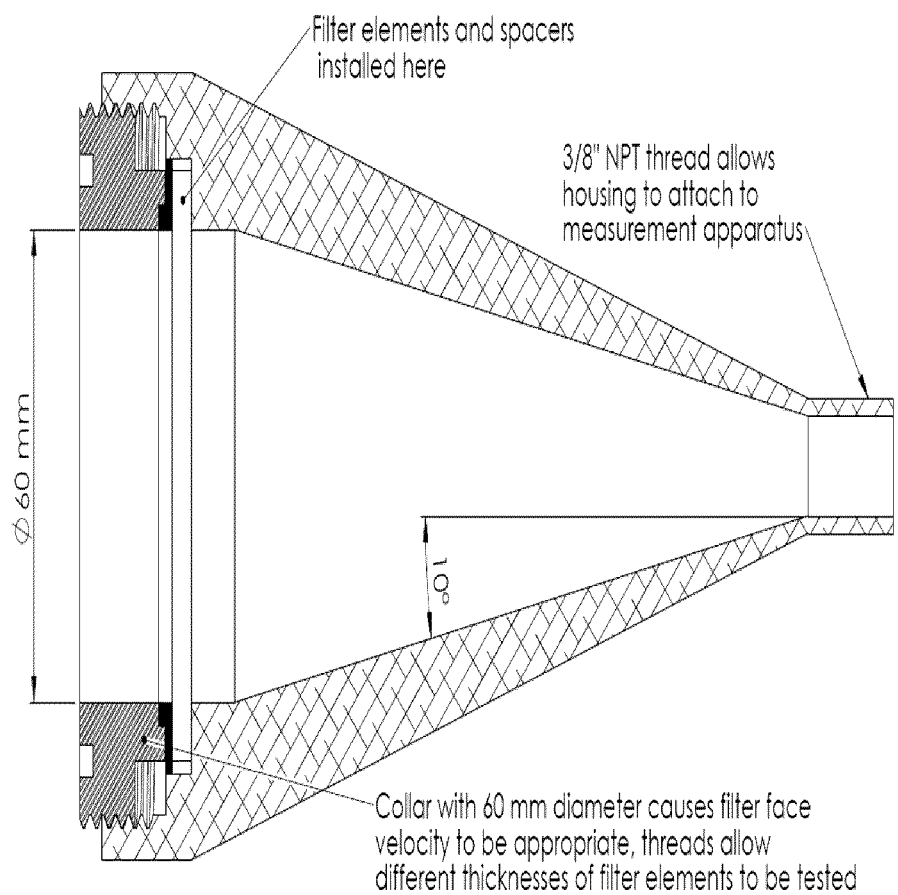
FIG. 14 is a cross-sectional schematic drawings of a filter housing assembly according to embodiments of the present disclosure.
Figure 16:
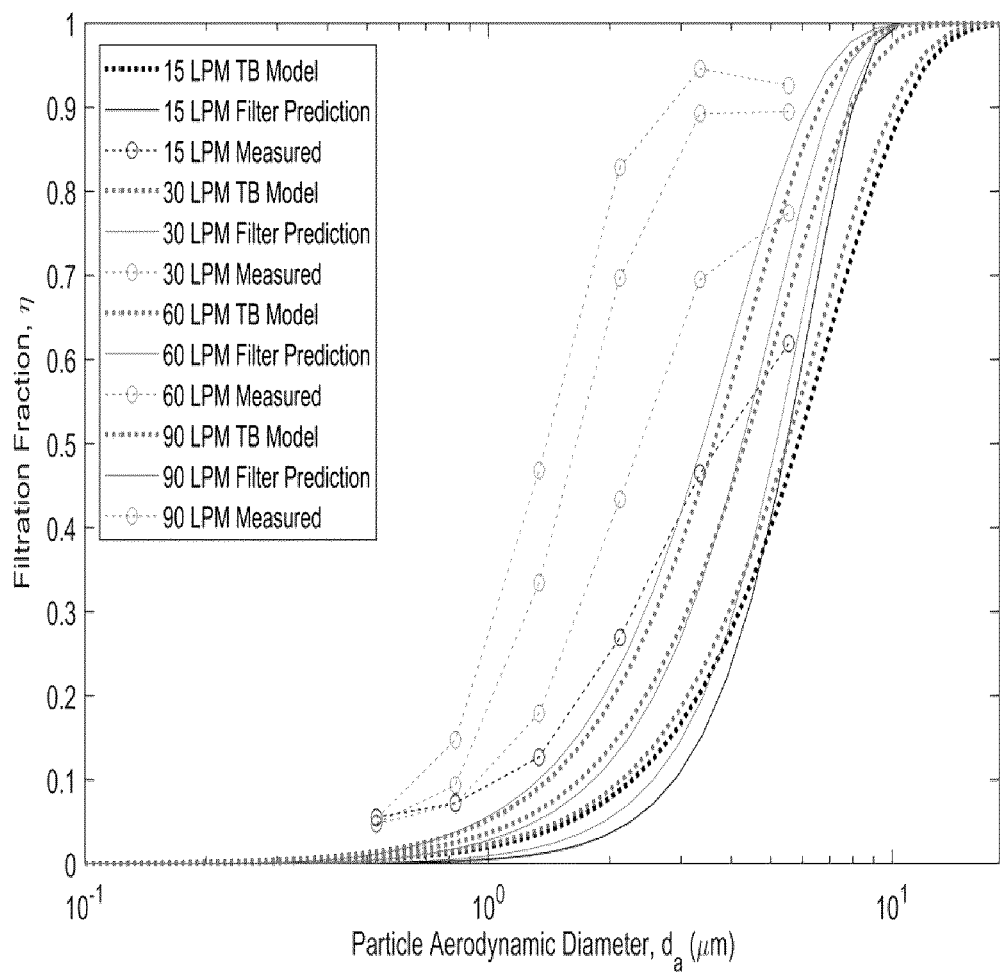
FIG. 16 is a graph showing measured filtration results of a 40 mm diameter filter consisting of seven layers of 500 mesh×0.0008 (inch wire diameter) (0.20 mm)" mesh spaced 0.012 inches (0.30 mm) apart.

To measure the filtration properties of various filter elements, two identical filter housings are manufactured and used such that custom filter elements are easily be installed. The housings are conical in shape with a 10° draft to gradually change the inner diameter (ID) from 12.7 mm (½", ID of ⅜" NPT pipe) to 60 mm. A schematic of the filter housing assembly is shown in FIG. 14. This draft angle provides that the filter housing is not prohibitively long and has minimal aerosol losses to the housing walls. The housings are machined from aluminum in order to avoid electrostatic effects. The housings allow filter elements of up to a 75 mm diameter to be installed, with multiple layers of similar or different elements separated by precision ground shims. A collar, also with a 60 mm ID, then fastens into the housing to press the layers against the spacers and to hold the filter in place. In this way, a constant diameter channel is formed such that the face velocity through the filter is known if the flow rate through the filter is known. Assuming constant flow across the filter, the face velocity is given by Equation 13.

$$V_f = \frac{Q}{A} = \frac{4Q}{\pi D^2}$$ Equation 13

Additionally, a smaller set of filter housings are manufactured with a 1" (25.4 mm) diameter that are used for initial iterations of filter element testing. The larger set is manufactured based on filtration results from earlier testing and estimates from CFD simulations. Filtration in a larger filter can be emulated by reducing the flow rate at which filtration is measured such that the face velocity corresponds to what would be observed in the larger filter at the intended flow rate. For example, to imitate filtration of a 60 mm diameter filter at 30 L/min, filtration can be measured at 5.38 L/min using the 1" (25.4 mm) diameter filter housing.

Figure 15:
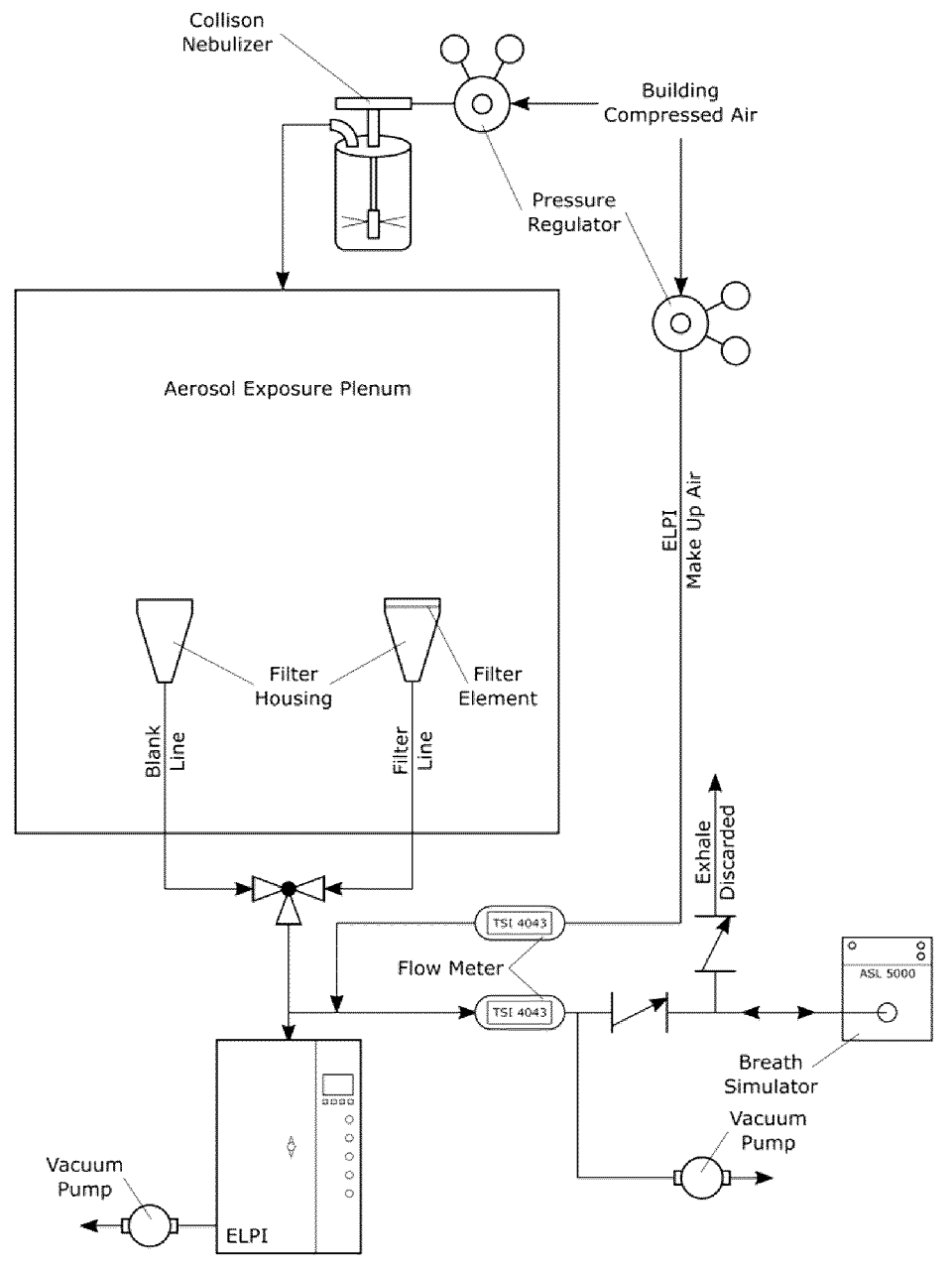

Filtration is measured by sampling aerosol from an aerosol exposure chamber through one of the filter housings with no filter element installed and then comparing the concentration measured when sampling through the filter element installed in the other housing. The procedure used for measuring deposition on the filter is well established for measuring deposition in model airways and has previously been described by Golshahi, Noga, Thompson, & Finlay (2011), Storey-Bishoff, Noga, & Finlay (2008), and Tavernini et al. (2018). The experimental method described in detail by the aforementioned authors is hereby incorporated by reference. Generally, an exposure chamber is filled with aerosol of jojoba oil generated by a 1-jet Collison nebulizer (MesaLabs, Butler, N.J., USA); two sampling lines (⅜" NPT stainless steel piping) extend into the chamber to which the filter housings are attached. An electrical low pressure impactor (ELPI) (Dekati Ltd., Kangasala, Finland) provides concentration data for the aerosol being sampled from the chamber, using a three-way ball valve the operator can control when the ELPI receives aerosol through the empty housing to characterize the aerosol and when the ELPI receives filtered aerosol. The experimental apparatus is exactly as it was for the experiments performed by Tavernini et al. (2018) except model airways have been replaced with filter housings and bottled compressed air is not used to supply the ELPI 'make-up' flow as the building compressed air supply is satisfactory. A schematic of the experimental apparatus is shown in FIG. 15. Aerosol is sampled from the chamber for one minute through the blank line to characterize the aerosol, then for one minute through the filter to observe filtration, then for another minute through the blank line to ensure the ambient aerosol conditions have not changed. The difference in these concentrations is assumed to be deposited on the filter element since the two lines contain identical fittings and lengths of pipe. The average concentration observed during each measurement period is used to calculate the filtration efficiency, given by Equation 14.

$$\eta = \frac{c_{blank} - c_{filter}}{c_{blank}}$$ Equation 14

Where $c_{filter}$ is the average aerosol concentration after passing through the filter and $c_{blank}$ is the average concentration observed during both periods of sampling through the blank filter housing. While the aerosol being sampled is polydisperse, filtration is attributed to the particle size corresponding to the geometric center of the particle size bin in consideration. The ELPI classifies aerosol into 12 particle size bins ranging in geometric centers from 45 nm to 9 µm aerodynamic diameter. For the present case we are concerned with filter efficiencies in the inertial range so data has been recorded for bins with geometric centers of 0.53, 0.83, 1.34, 2.12, 3.34, and 5.54 µm. Concentrations of the largest bin (geometric center of 8.75 µm) were found to be too low to provide meaningful filtration data so were not used. When measuring filtration in the 60 mm filter housings the 5.54 µm stage concentrations were too low as well so those data points were discarded.

Filtration is measured under constant and tidal flow conditions. Constant flow measurements are used to validate the CFD simulations, and to compare to tidal measurements, while tidal flow measurements are used to compare filter performance to target filtration curves. Filtration is measured at constant flow rates of 15, 30, 60, and 90 L/min, while tidal flow profiles are chosen such that the average inhalation flow rate corresponded to each tested constant flow rate (Table 1). Tidal flow profiles are generated by an ASL 5000 Breathing Simulator (IngMar Medical, Pittsburgh, Pa., USA); the exhale portion is discarded through a check valve near the breathing simulator in order to expose the filter during inhalation only, as is expected to be the case in practice. Thus, the filter is stagnant during the exhale portion of the breath. To reduce noise in the concentration measurement from the ELPI, the time spent with no flow through the model (the exhale time) is limited by increasing the duty cycle. The average inhalation flow rate remains unchanged but aerosol is provided more consistently to the ELPI thereby reducing peaks and valleys in the concentration data. The shape for the inhalation profile is a sinusoidal half wave. Actual tested flow rates differ slightly from target values due to pressure losses in the experimental apparatus; this is accounted for in the analysis of the filtration data.

TABLE 1

Tidal inhalation parameters corresponding to target average inhalation flow rate

| Profile | $V_t$ (L) | $t_i$ (s) | $Q_{avg}$ (L/min) | Source |
|---|---|---|---|---|
| 1 | 0.625 | 2.5 | 15 | ICRP 1994-sleeping adult male |
| 2 | 1.000 | 2.0 | 30 | Stahlhofen et al. 1989 |
| 3 | 1.200 | 1.2 | 60 | ICRP 1994-intermediate of heavy and light exercise |
| 4 | 1.500 | 1.0 | 90 | ICRP 1994-average heavy exercise |

The filtration measurements are performed multiple times and show that repeatability is good; the standard deviation of replicate measurements in the final prototype filters being only 0.83% on average.

Single Fiber Filter Theory

Figure 17:
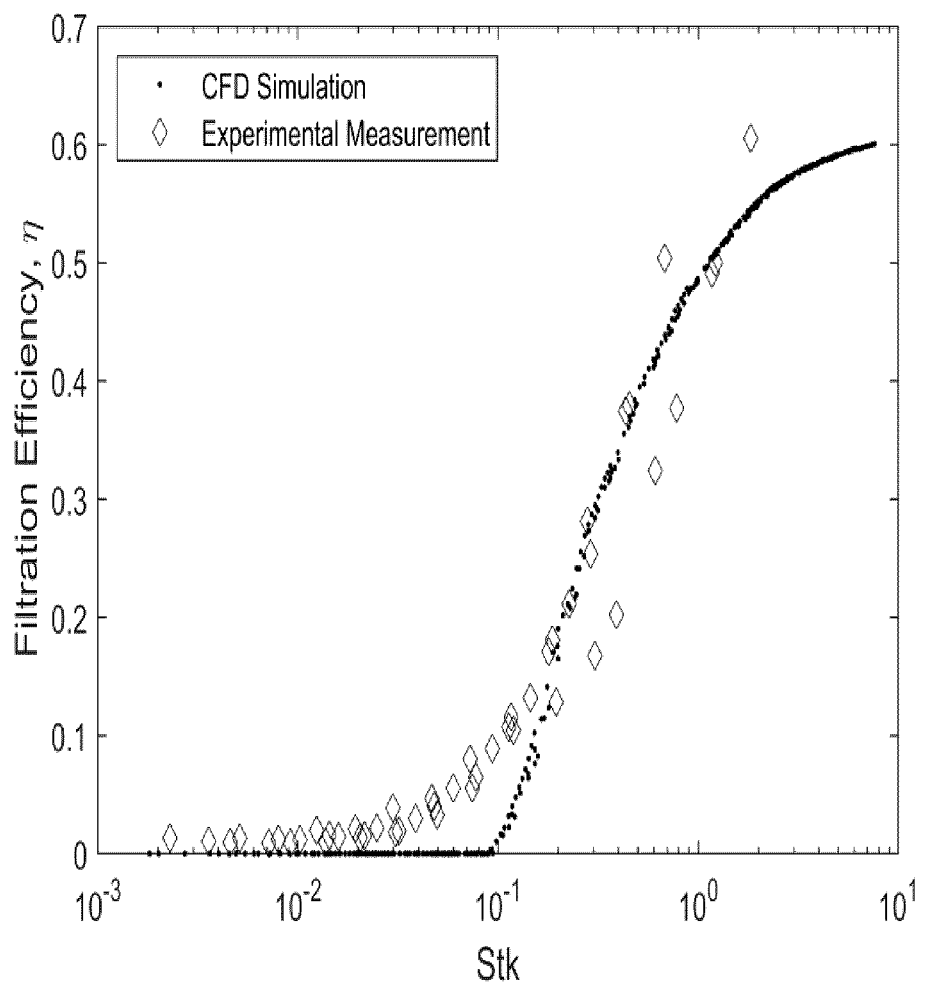
FIG. 17 is a graph showing validation of simulated filtration of one layer of 500 mesh×0.0008 (inch wire diameter) (0.20 mm) mesh by comparing experimentally measured filtration.
Figure 18:
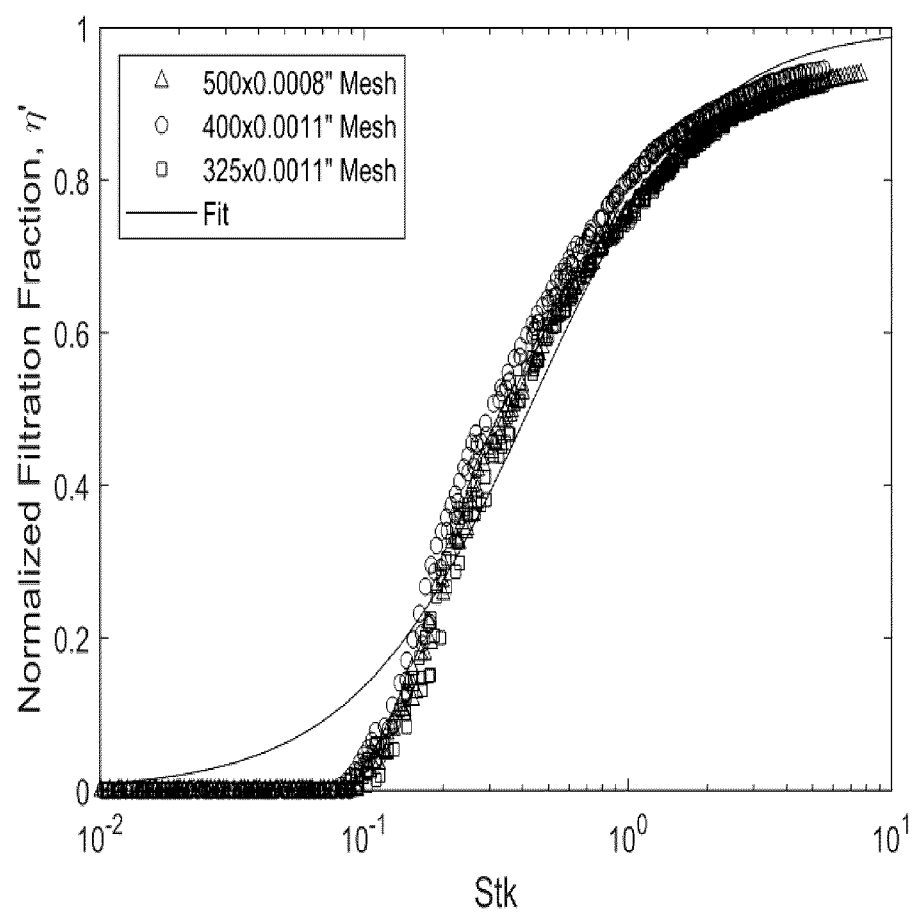
FIG. 18 is a graph showing Description of CFD simulation results using Equation 18.
Figure 19:
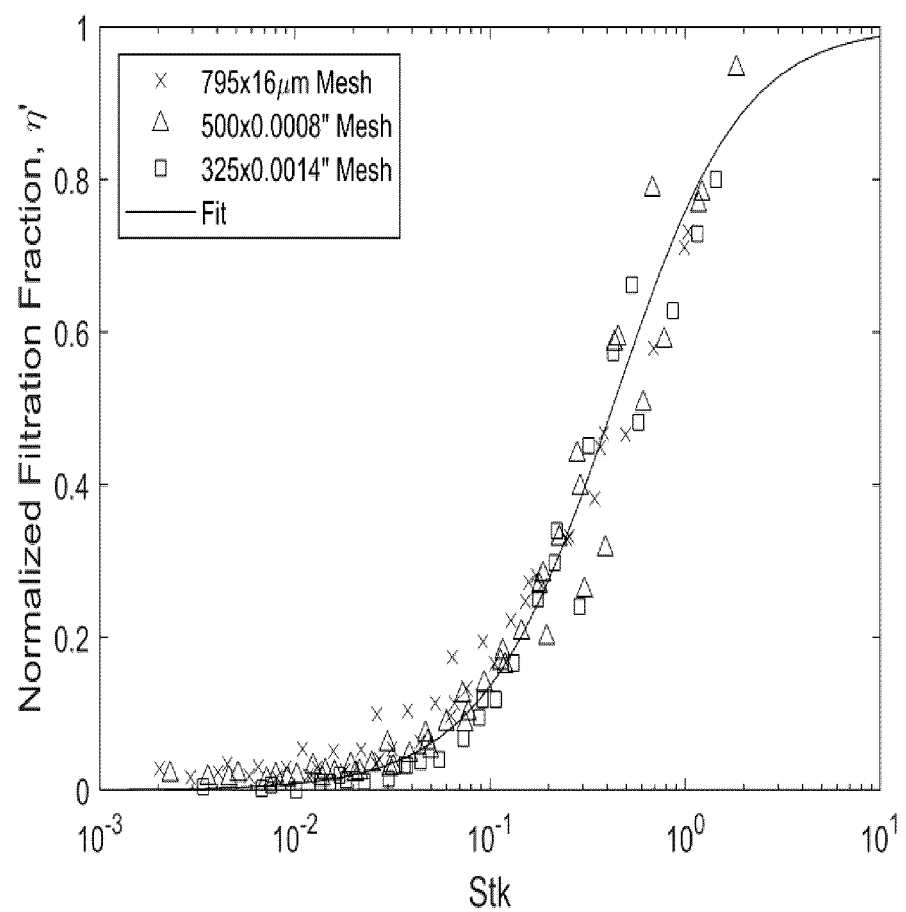
FIG. 19 is a graph using Equation 18 to describe experimental filtration results of a single layer of three different metal meshes.

According to embodiments, the physical parameters needed for a filter to mimic tracheobronchial deposition curves are determined by using the single fiber capture efficiency model of Nguyen & Beeckmans (1975). From this analysis and extrapolation outside the range of validity of the underlying filter equations, embodiments of a filter consist of seven layers of 500 mesh×0.0008 (inch wire diameter) (0.20 mm) mesh spaced at 0.012 inches (0.30 mm) with a face diameter of 40 mm. FIG. 16 shows measured filtration results of this 40 mm diameter filter consisting of seven layers of 500 mesh×0.0008 (inch wire diameter) (0.20 mm) mesh spaced 0.012" apart. The 'Filter Prediction' curves in FIG. 16 are the result of using the model of REF with the above mentioned filter properties, and the 'TB Model' curves are the predicted tracheobronchial deposition using the model of Stahlhofen et al. (1989). The measurements shown in FIG. 16 were performed in a 1" diameter filter at flow rates that would be equivalent to listed flow rates for measurements in a 40 mm face diameter filter assembly. The results shown in FIG. 16 prompted the development of a further inventive multi-mesh filtration model based on experimental and computational filtration of metal meshes, for use in a predictive capacity to specify a multi-mesh filter combination that would further mimic tracheobronchial deposition.

Single Layer Filtration Prediction Using Computational Fluid Dynamics

Simulated filtration results arc validated by comparing to experimentally measured filtration. FIG. 17 shows this validation for a 500 mesh×0.0008 (inch wire diameter) (0.2 mm) mesh. To compare results directly, the filter efficiency is plotted as a function of the particle Stokes number using the mesh wire diameter ($d_f$) as the characteristic length scale. The Stokes number arises from the non-dimensionalization of the particle equation of motion. The particle Stokes number's magnitude is inversely proportional to the particle's ability to react to a change in the fluid flow. The larger the magnitude of Stokes number the further the particle departs from the fluid streamlines and thus the larger its propensity to impact on an obstacle due to streamline curvature. For flow through the mesh filter, Stokes number (Stk) is defined by Equation 15.

$$Stk = \frac{V_f \rho_0 d_a^2 C_c}{18 \mu d_f} \quad \text{Equation 15}$$

where $V_f$ is the face velocity of the filter (calculated using Equation 13), $\rho_0$ is a reference particle density of 1000 kg/m$^3$ required for the use of aerodynamic diameter ($d_a$) for particle size, μ is the fluid viscosity, $d_f$ is the fiber (or wire) diameter of the filter, and $C_c$ is the Cunningham slip correction factor which accounts for particle slip due to non-continuum effects and given by Equation 16.

$$C_c = 1 + \frac{\lambda}{d_a}\left[2.34 + 1.05\exp\left(-0.39\frac{d_a}{\lambda}\right)\right] \quad \text{Equation 16}$$

where λ is the mean free path of air and in embodiments is 74 nm with laboratory conditions of 21° C. and 93 kPa. The agreement seen in FIG. 17 between the experimental and simulated filtration is good. The CFD data shows an abrupt starting point for filtration below which all particles pass through the filter; this is not observed experimentally due to diffusion effects and particle slip which are not included in the CFD simulation. However, the level of agreement provides for a predictive filtration model.

An important observation from FIG. 17 is that the filtration efficiency plateaus below 100% where the maximum filtration of a single layer of wire mesh is proportional to the fraction of the frontal area occupied by wire. The open area has no filtering capacity and a particle on a path through the middle of a cell will not be captured (assuming the particle is smaller than the cell opening and neglecting diffusion). Thus, the maximum filtering capacity of each wire mesh is assigned based on the wire area fraction ($A_w$) of the mesh which is a function of the number of wires per inch, N, and the wire diameter, $d_f$. Accounting for the overlapping wires, the wire area fraction is given by Equation 17.

$$A_w = 2Nd_f - N^2 d_f^2 \qquad \text{Equation 17}$$

where the wire diameter is in units of inches. The wire area fraction for 500 mesh×0.0008 (inch wire diameter) (0.20 mm) mesh is 64% which, by visual inspection, is the level of maximum filtration for simulated and measured filtration for the mesh as shown in FIG. 17. Since different meshes have different wire area fractions, this must be taken into account in a predictive filtration model. Filtration is non-dimensionalized by the wire area fraction and plotted against Stokes number for all the meshes simulated. The results are shown in FIG. 18. FIG. 18 shows that the use of Stk as the independent variable fully describes filtration. Of note is that the meshes do not obey the requirement of geometric similarity for dimensional analysis. This suggests that a single curve to precisely describe filtration in different meshes is difficult. However, the geometric differences appear to be small enough between the simulated meshes to allow approximate description of their filtration properties with a single curve. A filtration function is therefore identified by fitting a sigmoidal function to the data using non-linear least squares fitting. The Levenberg-Marquardt algorithm is used to optimize the fit. The result is shown with the simulated filtration data in FIG. 18 and is given by Equation 18.

$$\eta' = \frac{\eta}{\eta_{max}} = 1 - \left(\frac{0.412}{0.412 + Stk^{1.255}}\right)^{1.155} \qquad \text{Equation 18}$$

where $\eta_{max}$ is the maximum possible filtration for a given mesh, based on its wire area fraction. Equation 18 gives the filtration function for a single layer of metal mesh. Based on this developed equation, additional simulations and experiments are performed for a 795×16 μm mesh. Equation 18 successfully predicts these results. FIG. 19 shows experimental filtration data for a selection of meshes described by Equation 18.

Extending CFD Results to Multilayer Filtration Estimates

Equation 18 is valid for a single mesh layer. To develop filter combinations that closely mimic the deposition efficiency of the tracheobronchial region, including the appropriate dependency on particle size and flow rate, a multi-mesh model to further match tracheobronchial deposition efficiency curves is developed. For this purpose, filtration is calculated for each layer based on its unique properties and then an overall filter efficiency is calculated based on the contributions of each layer. The properties of each layer are allowed to vary including mesh number, N, wire diameter, $d_f$, and layer face diameter, D. By allowing the face area to vary from layer to layer, the face velocity for each layer is tuned to provide optimal filtration in the overall filter.

Figure 20:
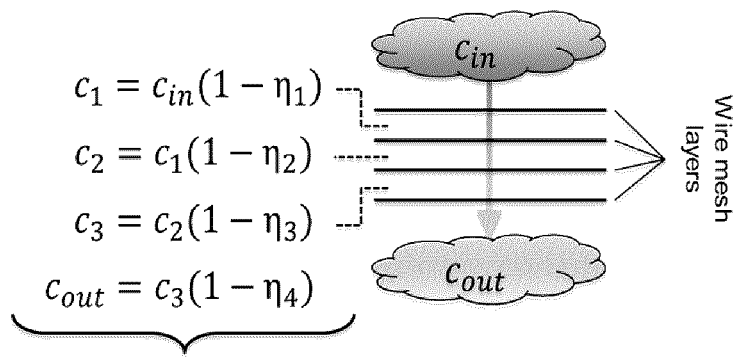
FIG. 20 shows the physical and mathematical reasoning for the form of Equation 19.

For n layers of mesh, the overall filter efficiency equation can be written according to Equation 19.

$$\eta_{filter} = 1 - \prod_{i=1}^{n} \{1 - \eta_i\} \qquad \text{Equation 19}$$

where $\eta_i$ is the filtration efficiency for each layer. Physical reasoning for this form is shown in FIG. 20. If each layer's filtration is simply calculated using Equation 18 the resulting filtration is far higher than observed. This is due to the underlying assumption of evenly distributed aerosol incident on the wire mesh. While this assumption is valid for the first layer of the mesh, it is not true for subsequent layers of mesh due to the filtration of the first mesh. Considering the velocities and sizes of the particles considered here as well as the flow around the mesh gives physical reasoning for the reduced filtration of subsequent layers. The largest Reynolds number (Re) of the flow around the mesh wire for the parameter ranges considered here is Re=2.9 for a face velocity of 1.55 m/s around a wire having a diameter of 28 μm. Flow around an isolated cylinder is well documented and is known to remain attached for creeping flow (Re≲1) (Çengel & Cimbala, 2010), e.g. using numerical simulations to study laminar flow over cylinders Rajani, Kandasamy, & Majumdar (2009) found the flow to stay attached up to Re=6.0. Although the cylinders making up the wire mesh are not isolated from one another and the overlapping wires affect the flow condition, the wires do not introduce turbulent mixing to the downstream flow. Thus, the only particles that will remain downstream of the wires are those that can follow the streamlines close enough to avoid impaction. The only other mechanism that tends to redistribute the aerosol downstream of the first mesh is diffusion. Diffusion distances are greatest for the smallest particles, so considering diffusion for a 0.5 μm particle in the flow with the largest time between layers (0.02 seconds for 1 mm layer spacing and a face velocity of 0.05 m/s) the root mean square displacement is 1.6 μm. This distance is less than one fifth of the smallest wire radius considered and indicates diffusion into the region voided of aerosol is minor. Further, diffusion into the aerosol voided region is only important for particles that are captured by the first layer, since otherwise diffusion rates into and out of the region behind the wire are similar. This means diffusion effects are more important for larger particles at faster flow rates, however diffusion distances for these conditions are much smaller. As a consequence, the filtration of the first layer leaves a 'shadowed' region void of particles that have been removed by the first layer. Any portion of the second layer mesh lying in the shadowed region will not filter any aerosol. This carries forward for the third mesh, which will lie in the shadows of both the first and second layers, and so forth. This leads to using the single layer efficiency model as a nominal filtration for each layer with some sort of filtration efficiency reduction function being applied to the downstream layers, and Equation 19 becomes Equation 20.

$$\eta_{filter} = 1 - \prod_{i=1}^{n} \{1 - \eta_i(1 - R_i)\} \qquad \text{Equation 20}$$

where $\eta_i$ is the nominal filtration efficiency for each layer given by Equation 6 and $R_i$ is the shadow reduction applied to the ith layer. Since there is no reduction applied to the first layer, $R_1$ has a value of zero.

Figure 21:
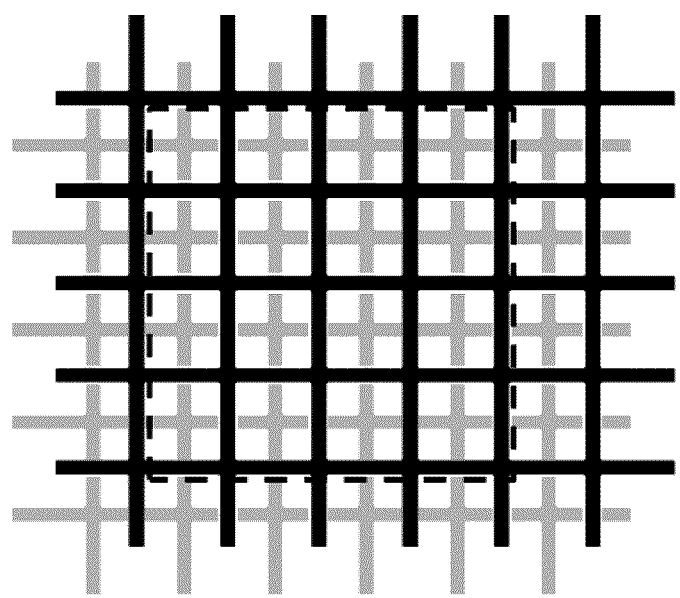
FIG. 21 is a schematic of overlapping meshes with minimal overlapping area.

The final step in developing the multi-mesh predictive model requires identifying the reduction function. From geometric constraints, upper and lower bounds of the shadowed region are identified. The upper bound of the reduction function is relatively trivial i.e. if the second mesh lies perfectly behind the first, the second mesh will filter no aerosol and so $R_{2,max}=1$. The lower bound, or $R_{2,min}$, occurs when the least amount of the second mesh is shadowed by the first mesh. This occurs when the second mesh is perfectly misaligned with the first as is shown by FIG. 21. In FIG. 21, if the dashed outline represents a 1"×1" square, then for this mesh N=4. It can be seen that there are $N^2$ instances where the horizontal wires of the second mesh are behind the vertical wires of the first mesh and another $N^2$ instances where the vertical wires of the second mesh arc behind the horizontal wires of the first mesh and each instance has an area equal to $d_f^2$ leading to Equation 21. For identical meshes, on a per square inch basis there are $2N^2$ overlaps of area $d_f^2$ so the minimum shadowed area fraction and thus $R_{2,min}$ is given by Equation 21.

$$R_{2,min} = 2N^2 d_f^2 \quad \text{Equation 21}$$

where $d_f$ must have units of inches. The actual value of $R_2$ will lie somewhere between these two bounds depending on how the mesh is oriented. Note that the angle of the second mesh to the first mesh will add additional complications to the actual value of the reduction function. Further, it is unlikely that meshes are either perfectly aligned or perfectly misaligned when the rotation of the meshes is also possible. Additionally, for dissimilar meshes the lower and upper bounds for the reduction function are further complicated due to the cyclical frequency of the wires overlapping each other.

Because of the above noted complications, a simple form of the reduction function is identified that allows Equation 20 to be used to describe experimental filtration measurements in multi-layer meshes. This form assumes an average overlapping area (AOLA) and applies it to each layer using Equation 22:

$$R_i = \text{AOLA}(i-1) \quad \text{Equation 22}$$

Figure 22:
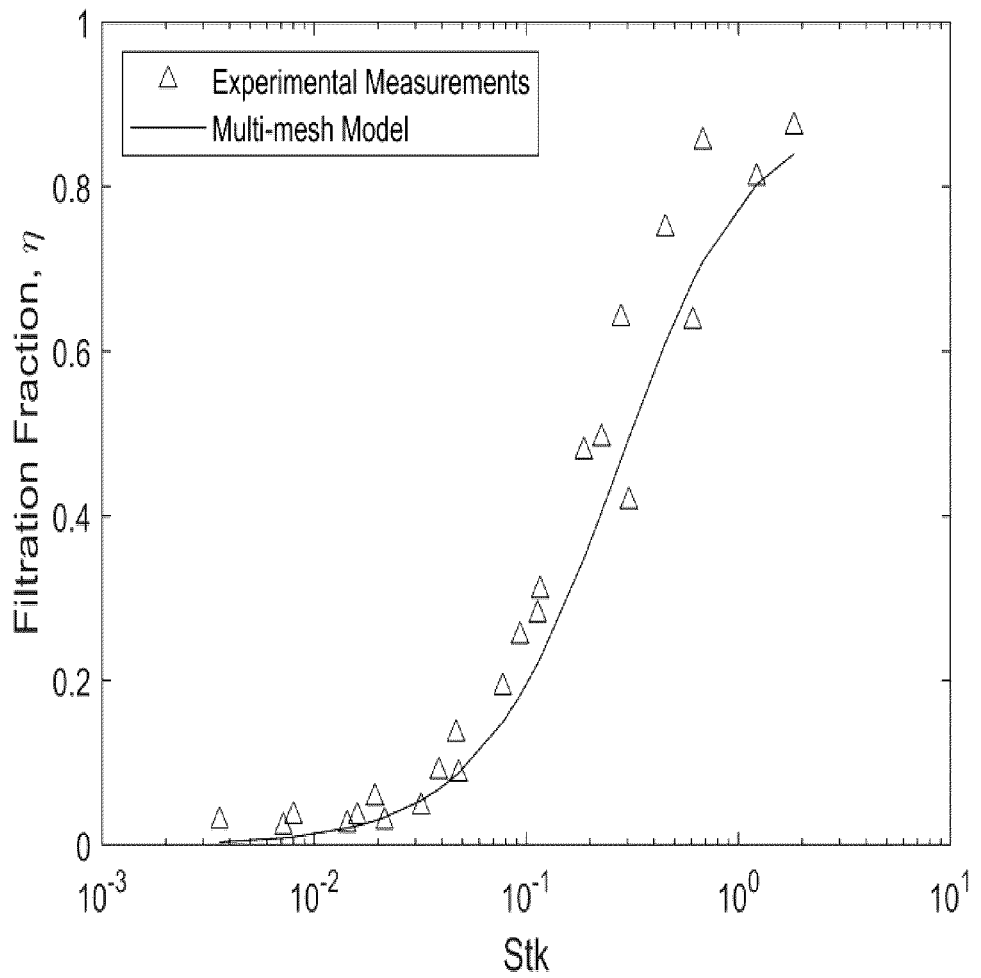
FIG. 22 is a graph showing measured filtration in 3 layers of 500 mesh×0.0008 (inch wire diameter) (0.20 mm) mesh and multi-mesh model prediction.
Figure 23:
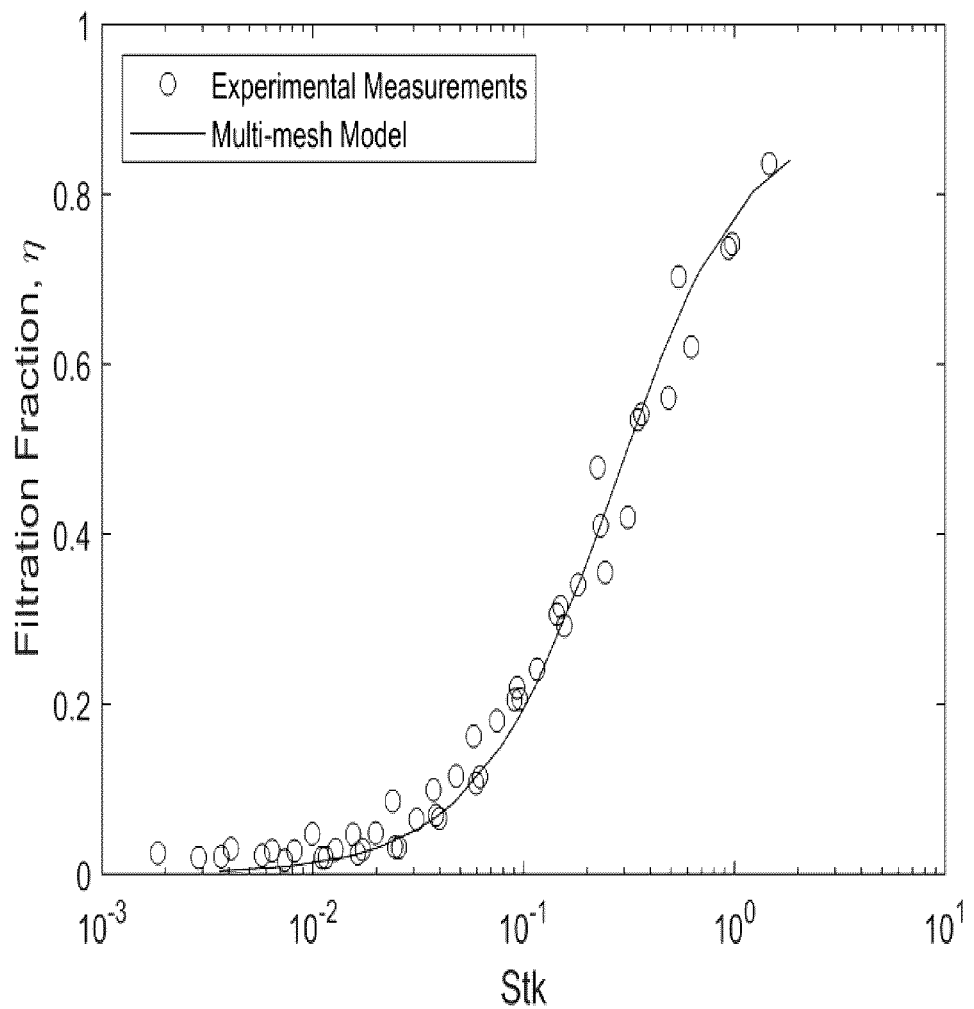
FIG. 23 is a graph showing measured filtration in 3 layers of 400 mesh×0.001 (inch wire diameter) (0.03 mm) mesh and multi-mesh model prediction.

Note that this form can only be used up to $i=1+(\text{AOLA})^{-1}$ otherwise the function becomes negative. The result of using this form with an AOLA=0.2 to describe experimental filtration of three layers of 500 mesh×0.0008 (inch wire diameter) (0.20 mm) mesh and three layers of 400 mesh×0.001 (inch wire diameter) (0.03 mm) mesh is shown in FIG. 22 and FIG. 23, respectively. Because each layer has the same wire diameter Stk can be evaluated using the wire diameter as the characteristic length and results can be compared directly to the prediction. Seeing satisfactory agreement, the final multi-mesh model is represented by Equation 23.

$$\eta_{filter} = 1 - \prod_{i=1}^{n} \{1 - \eta_i(1 - 0.2(i-1))\} \quad \text{Equation 23}$$

which is theoretically valid for up to five layers of mesh (the sixth layer efficiency would be multiplied by zero and will not change the solution). Using this model, filtration of many combinations of between one and five meshes of varying types and face diameters is calculated to identify filter combinations yielding targeted filtration efficiencies.

Prototype Filter Results

A graphical user interface (GUI) is developed in MAT-LAB (R2018a, MathWorks, Natick, Mass., USA) which allows the user to enter unique properties for up to five layers of mesh including the layer mesh type (N and $d_f$) and the layer diameter (D). The program estimated the filtration performance of the combination of properties entered by the user using Equation 23 and displayed the results graphically along with the tracheobronchial deposition fraction model of Stahlhofen, Rudolf, & James (1989). So as not to crowd the filtration graph, only one tracheobronchial deposition model was included for comparison to the predicted mesh filter performance.

Figure 24:
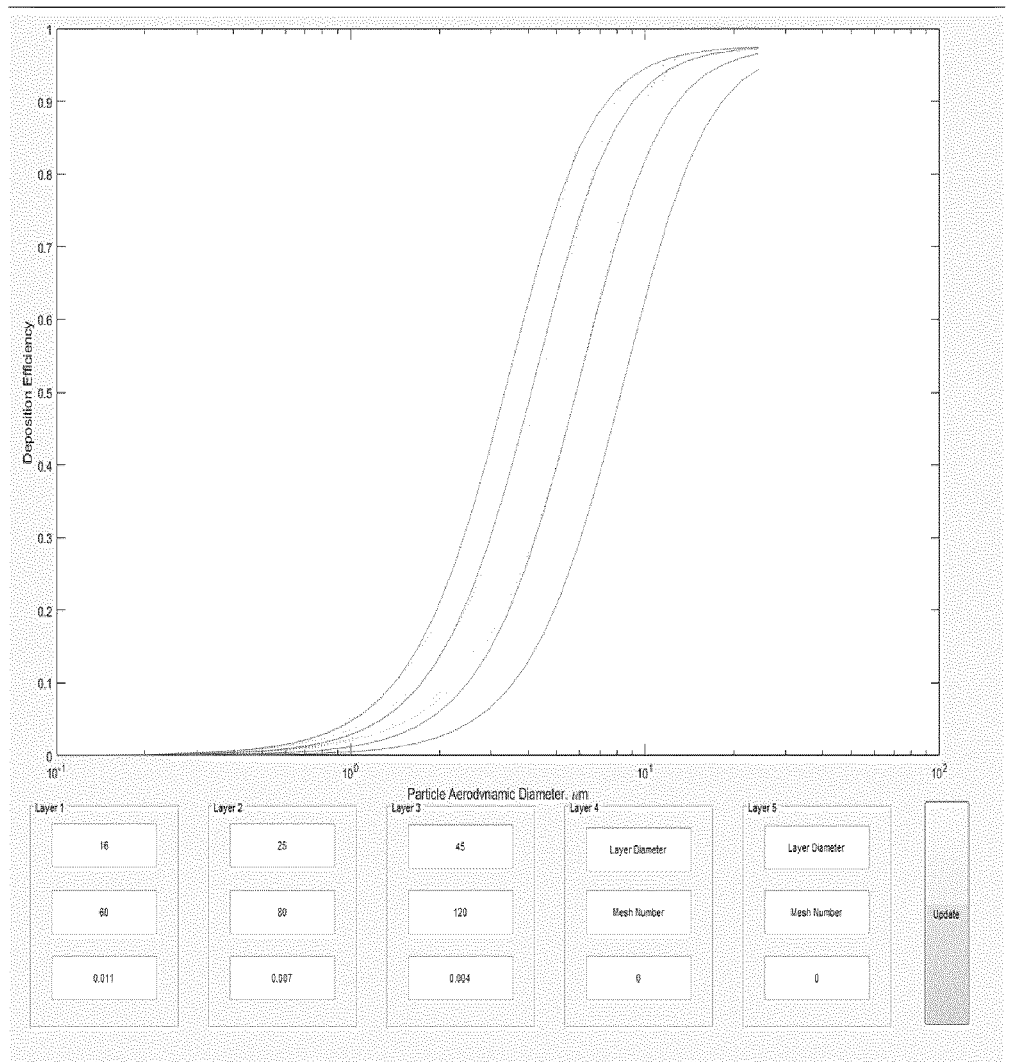
FIG. 24 is a screen capture of GUI interface and multi-mesh model prediction for variable face diameter filter solution, in which solid curves are the multi-mesh prediction while faint dotted lines are tracheobronchial deposition efficiencies based on Stahlhofen et al. (1989). Blue, green, red, and pink curves correspond to an inhalation flow rate of 15, 30, 60, and 90 LPM respectively.

Since, based on Equation 18, meshes with a low open area yield higher filtration, available meshes with the highest wire area fraction are chosen to provide increased maximum filtration. These meshes are relatively coarse compared to what the model is developed for. One of the first potential solutions includes a variable diameter filter having filter elements positioned at the correct location in an expanding cone such that the face velocity through each element would be appropriate for each mesh type. This solution consists of the following layers: one layer of (60 mesh count)×(0.011 inch wire diameter) (0.28 mm) mesh with a 16 mm face diameter, followed by one layer of (80 mesh)×0.007 (inch wire diameter) (0.18 mm) mesh with a 25 mm face diameter, followed by one layer of 120 mesh×0.004 (inch wire diameter) (0.10 mm) mesh with a 45 mm face diameter. The model prediction for this mesh combination is shown in FIG. 24. For a variable diameter filter design, new filter housings are manufactured for each solution that had different layer diameters. Thus, before manufacturing filter housings for this solution, single layer filtration is measured and compared to the predictions provided by Equation 18. Equation 18 fails to predict filtration for these meshes with wire diameters much larger than the meshes for which the model was developed.

Figure 25:
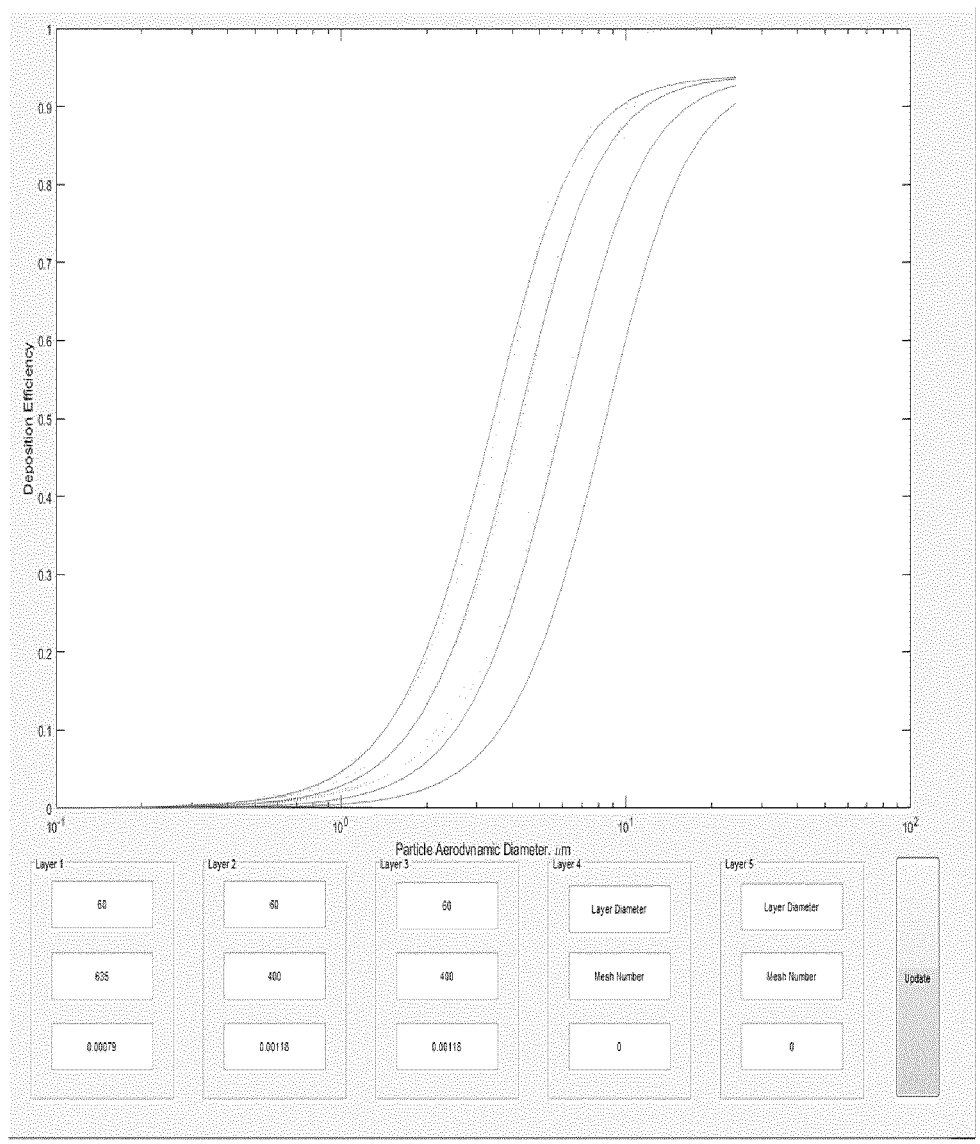
Figure 26:
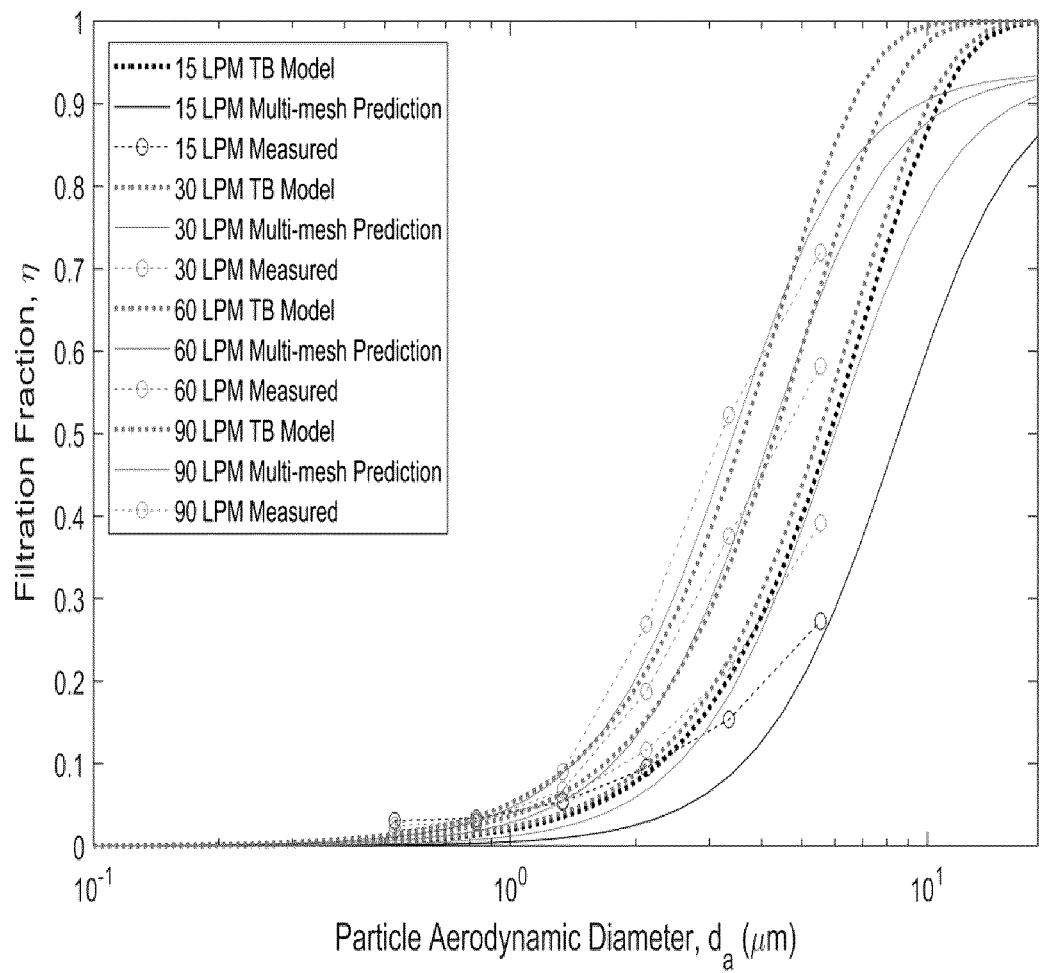
Figure 27:
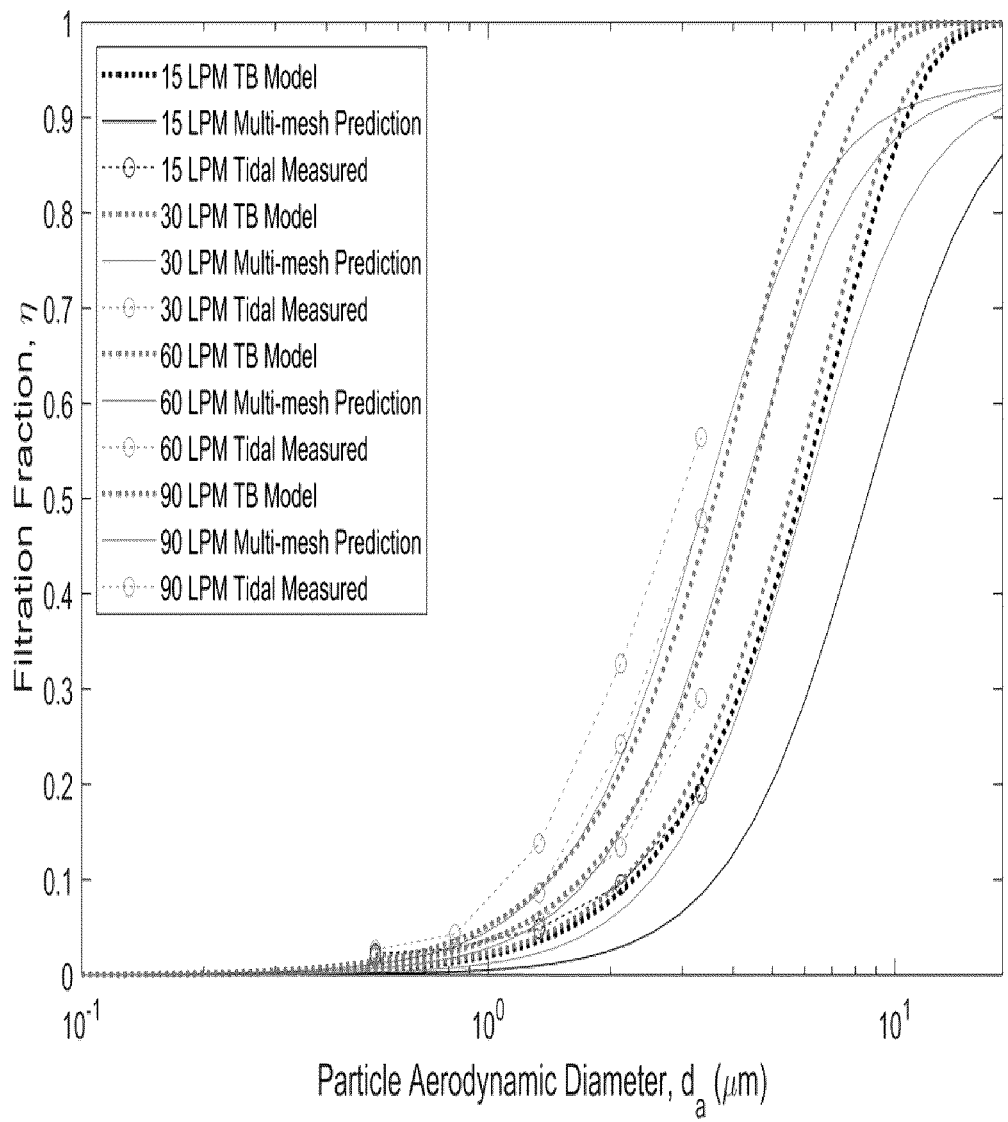

Instead, focus shifted back to fine meshes with properties closer to those for which the model was developed. Although the wire area fraction of these meshes is not as high, the correct combination of meshes provides appropriate filtration. Using the MATLAB GUI again, a new solution is found which consists of three layers of mesh with a constant face diameter of 60 mm. The first layer is a 635×20 µm mesh, while the second and third layers are both 400×30 µm mesh. The GUI output for this combination of filter elements is shown in FIG. 25. Initial filtration measurements are performed using the 1" diameter filter housing with constant flow at flow rates adjusted to provide the appropriate face velocities that would be seen in the full scale filter. Close agreement with the CFD prediction and tracheobronchial deposition models (FIG. 26) result. Accordingly, full scale filter housings with 60 mm filter face diameters are developed. Constant flow results in the 60 mm filter show fair agreement with the initial measurements in the small filter. Slight discrepancies such as small errors in flow rate in the small filter arc magnified relative to similar errors in the full scale filter due to increased face velocity sensitivity to flow rate in the small filter. Filtration measured under simulated tidal breathing is shown in FIG. 27. Slightly increased filtration is seen under tidal inhalation compared to constant flow at the same average inhalation flow rate. This is due to increased filtration occurring when the instantaneous inhalation flow rate is higher than the average inhalation flow rate. Decreased filtration occurs when the instantaneous flow rate is less than the average inhalation flow rate, but due to the non-linear nature of the filtration function, the difference of the increased filtration is larger the decreased filtration and causes the overall filtration to be slightly higher. This increase in filtration causes the filtration under variable flow to be deemed too high compared to the target tracheobronchial deposition models. To allow for even more straightforward inhaler testing with this filter, the filter is tuned to have slightly less filtration to even more accurately mimic the target deposition curves and imitate tracheobronchial deposition correctly under variable inhalation profiles.

Figure 28:
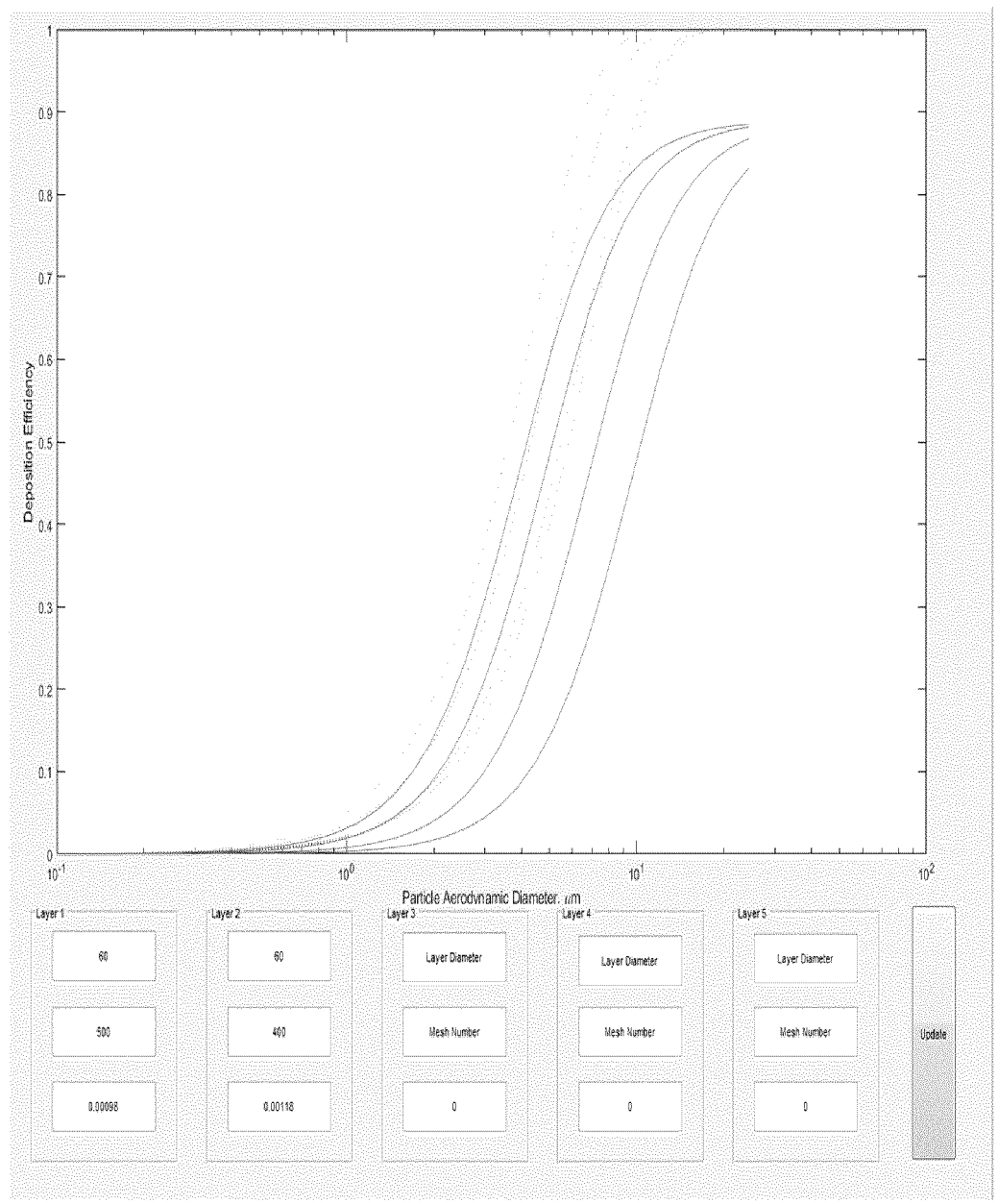
Figure 29A:
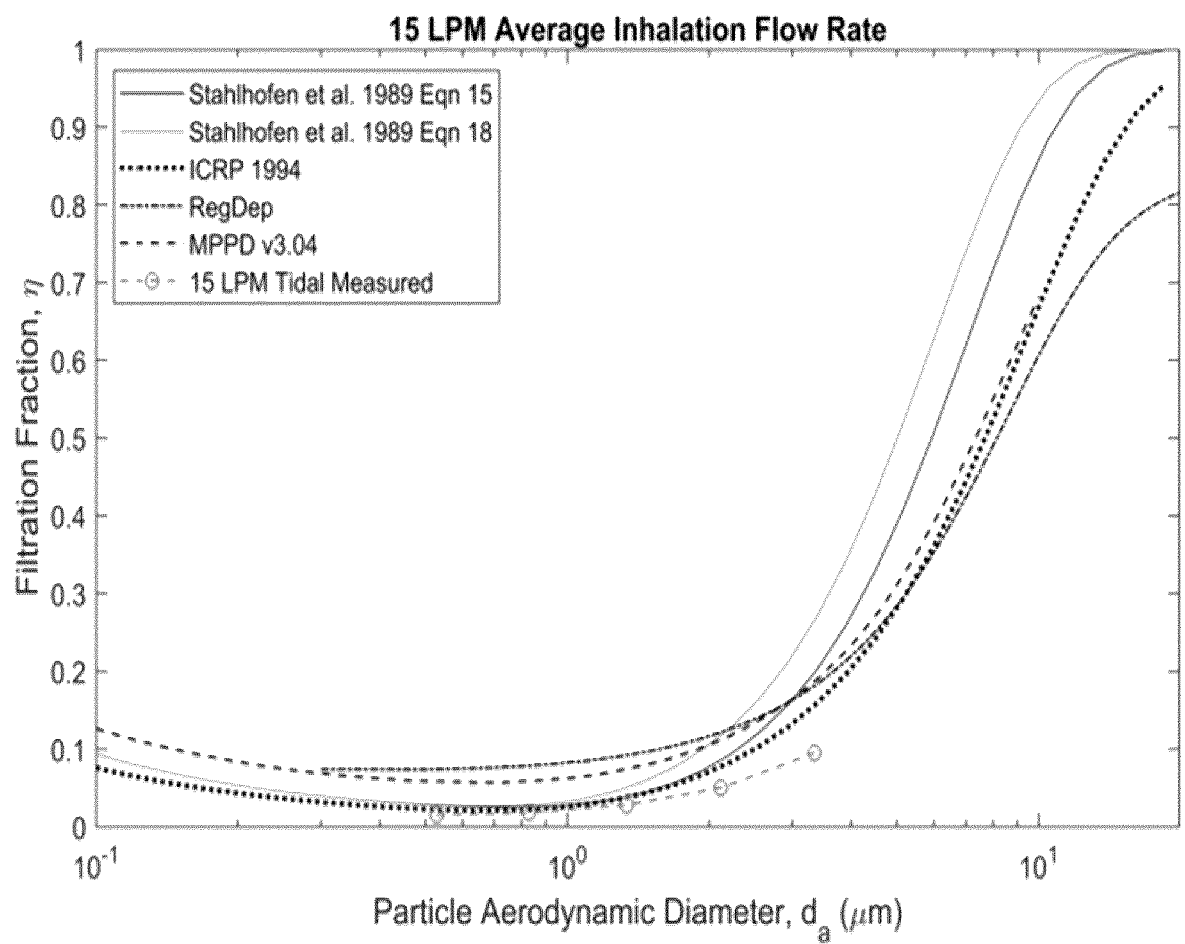
Figure 29B:
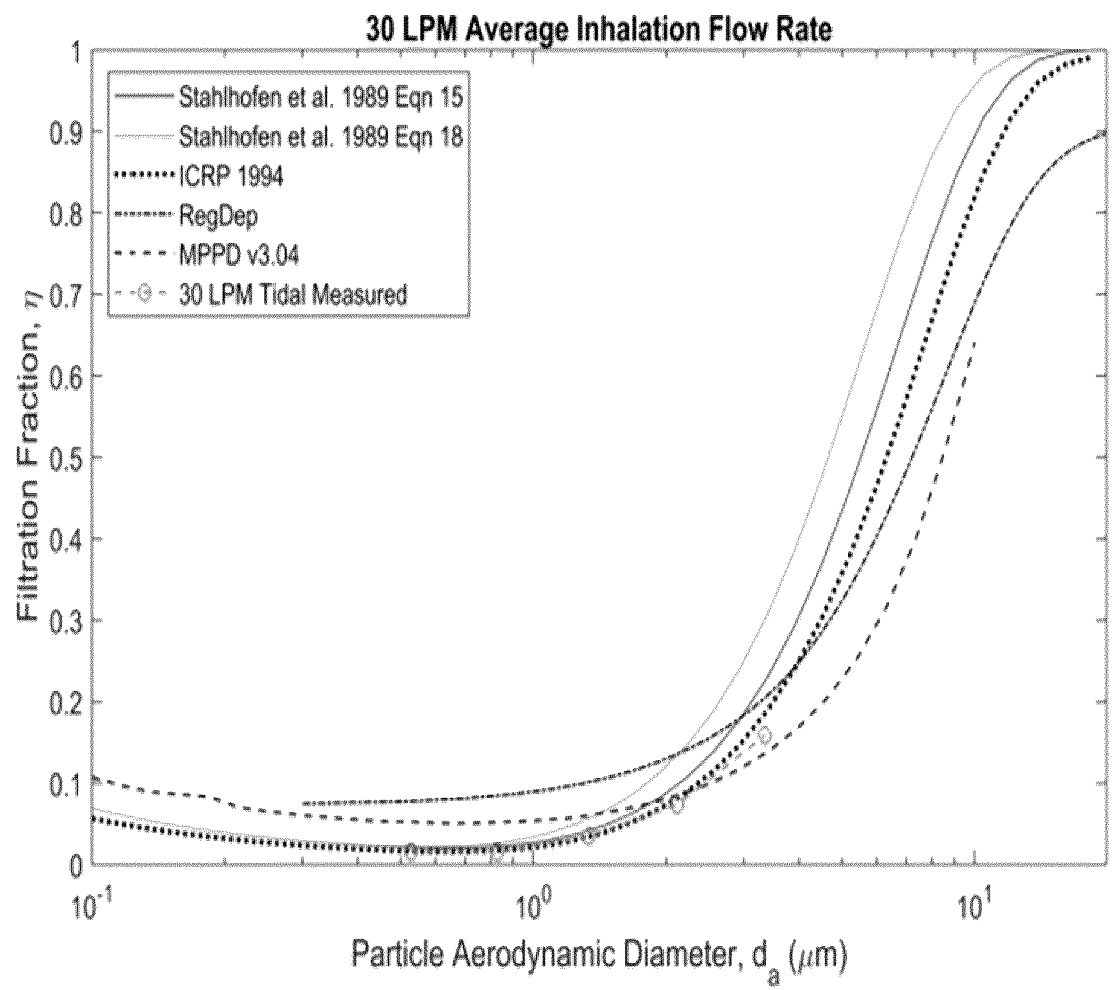
Figure 29C:
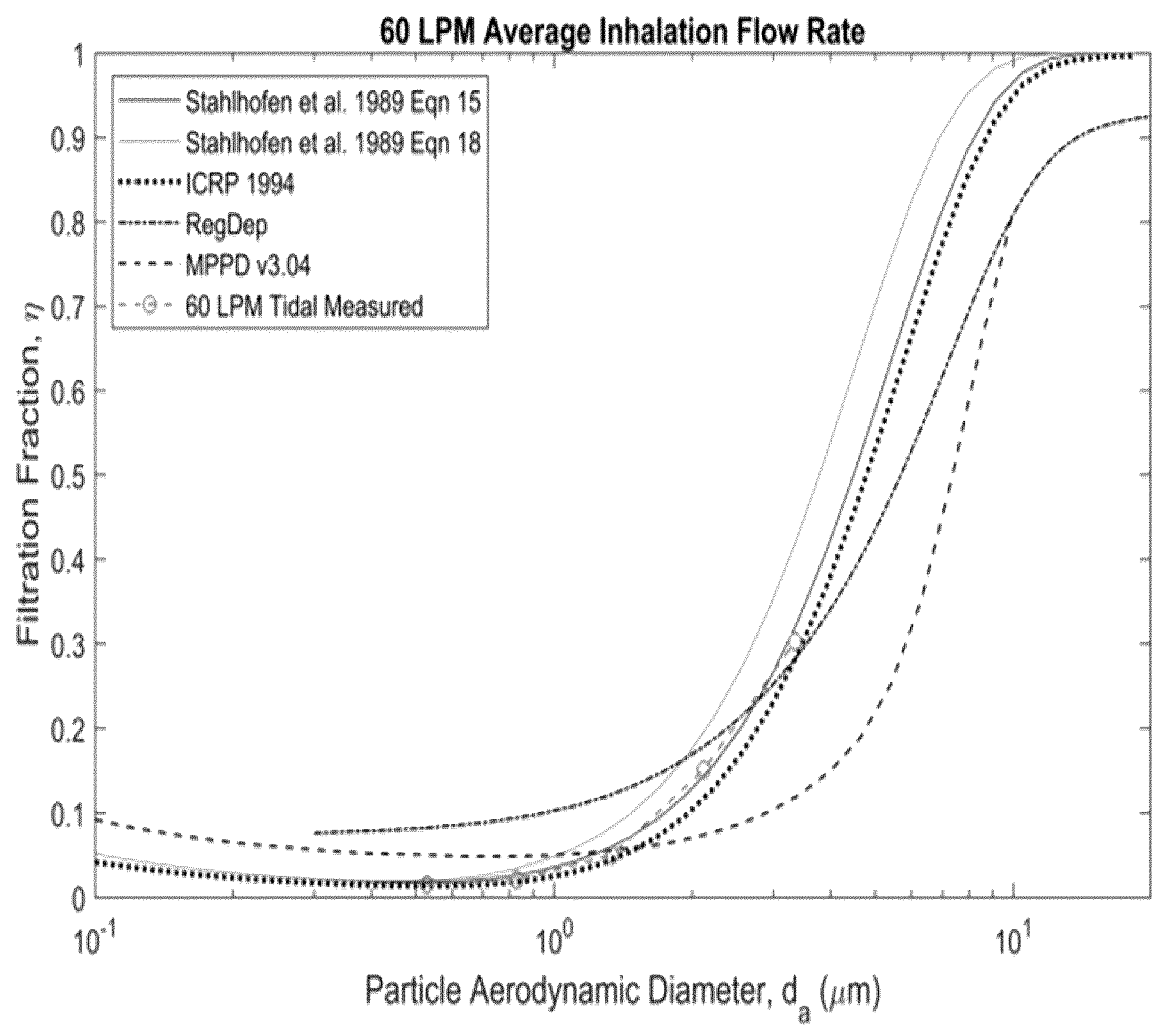
Figure 29D:
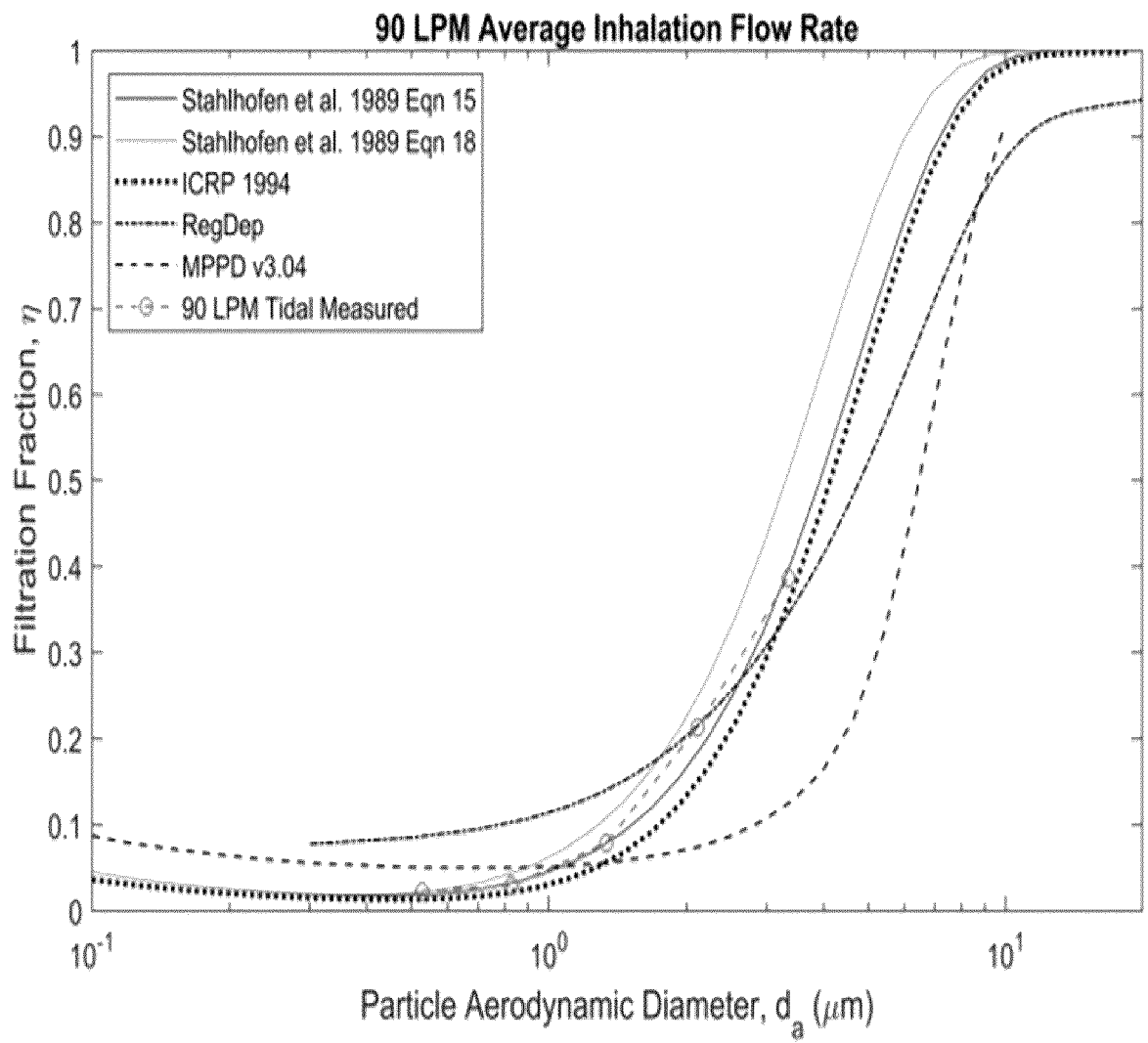
Figure 30:
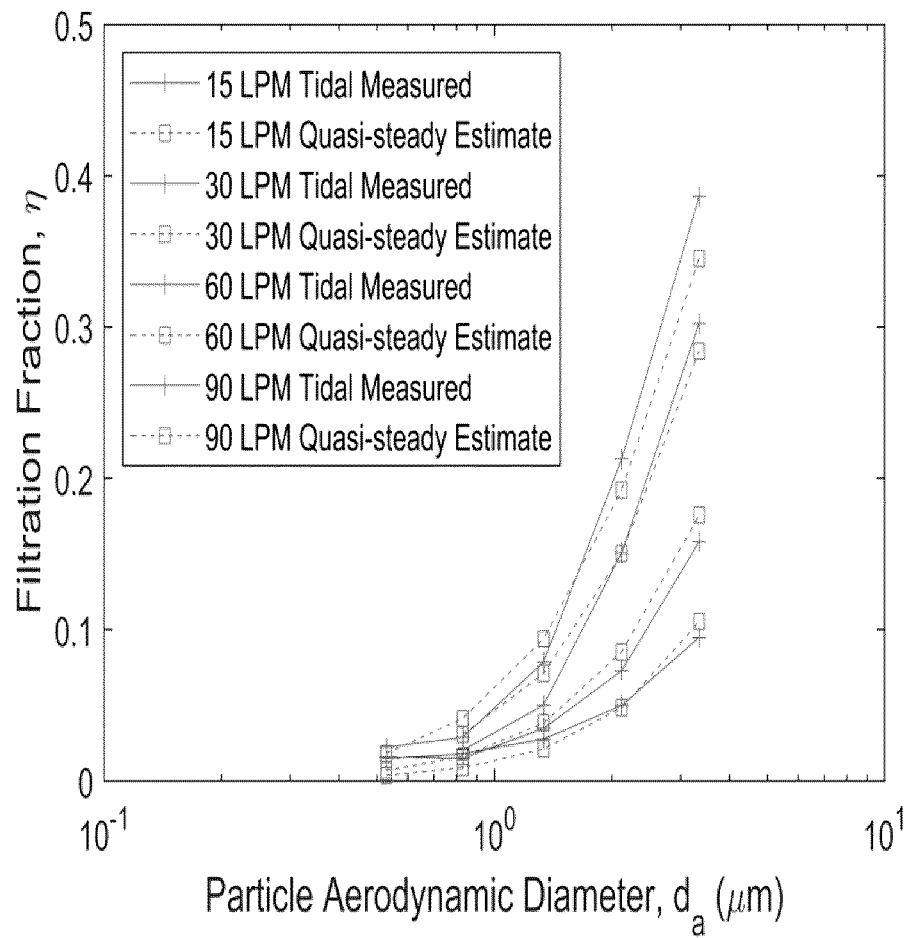

The GUI is again used to identify further filter combination embodiments. Using the results of the previous iteration, a predictive result is found under the assumption that tidal measurement would again be slightly higher and would agree well with the tracheobronchial deposition curves. This time, a two layer solution with constant filter face diameter of 60 mm is found. According to this embodiment, the first layer is a 500×25 μm mesh and the second layer is a 400×30 μm mesh. The GUI predicts filter performance for constant flow is shown in FIG. 28. Again, good agreement is demonstrated for constant flow filtration measurements. Tidal flow measurements are performed and as expected the results are slightly higher than the constant flow results and thus agree well with the target tracheobronchial deposition curves (FIGS. 29A-29D). The filtration efficiency of the filter accurately captures the general trend of the tracheobronchial deposition models. No single model can be considered as 'the' model for tracheobronchial deposition due to the uncertainties associated with quantifying in-vivo deposition in addition to inter-subject variability. While the filtration curve for 15 LPM average inhalation is slightly lower than the deposition models, this discrepancy is tolerable since this flow rate is below that which most inhalers will be tested.

Further analysis of the difference in constant flow and variable flow filtration measurements further demonstrates the filter performance, specifically examining if transient effects contribute to the variable flow filtration increase. From the non-dimensionalization of the equations governing the fluid flow through the filter, the Navier-Stokes equations for incompressible flow, two key dimensionless parameters arise: the Reynolds number ($Re=\rho V_f d_f/\mu$, where ρ and μ are the fluid density and viscosity, respectively) and the Strouhal number ($St=fd_f/V_f$, where f is the frequency of oscillation in the flow). The Strouhal number is the ratio of the importance of the unsteady term to the convective term in the equations while the Reynolds number is the ratio of the convective term to the viscous term. For small values of St the unsteadiness of the flow does not have a large impact on the overall solution and the unsteady term is able to be neglected relative to the convective term. Further, the product of St and Re can be considered as the ratio of the unsteady term to the viscous term so if this value is small too, then the unsteady effects are negligible compared to both the convective and the viscous terms and unsteady effects impact the overall flow solution negligibly. For St, the largest value occurs at the highest frequency and largest wire diameter but the lowest inhalation flow rate. The lowest face velocity tested is $V_f=0.09$ m/s (corresponding to a flowrate of 15 L/min through the filter) and the largest wire diameter is 30 μm, giving a maximum Strouhal number of St=0.0003, indicating that unsteady effects are not important compared to convective forces. Also, the largest Re for this filter evaluated at the highest measured peak flow (about 130 L/min) is Re=1.53 so the product of Re and St is expected to be small for all conditions. Furthermore, the Reynolds number at peak St will be less than this maximum, as will the Strouhal number at peak Re. Thus, unsteady effects do not affect the performance of this filter.

The above dimensionless considerations suggest that filter performance can be described in a quasi-steady manner. Accordingly, the constant flow filtration results are used to develop a filtration equation for the filter under constant flow. Then, using this filtration equation the filter performance under variable flow is predicted by numerically integrating the deposition function over the inhalation profile in a quasi-steady manner. To collapse the data onto a single curve the impaction parameter ($IP=d_a^2Q$, where $d_a$ is the particle aerodynamic diameter and Q is the flow rate through the model) is used to avoid identifying a characteristic diameter to use in the Stk equation since the two layers have different wire diameters. Using the same curve fitting algorithm as was used with the CFD results, the constant flow filter equation is represented by Equation 24.

$$\eta = 1 - \left(\frac{876}{876 + IP^{0.936}}\right)^{0.732} \quad \text{Equation 24}$$

where IP has units of μm$^2$·L/min. Notably, the filtration plateau is not included in this equation so it is less valid for filtrations near 100%.

Variable flow performance of the filter using Equation 24 are estimated by integrating over the inhalation profile since IP is a function of time. This is done numerically by discretizing the inhalation profile into small time steps and treating the flow as constant at each time step. For example, each inhalation profile is broken into 100 equal time steps. At each time step the number of particles entering the filter and the number deposited are calculated. The volume of the filter and the residence time is neglected. Then, the particles entering and deposited are summed over the entire breath and average filtration over the entire breath is calculated as the number deposited divided by the number entering the filter. Comparison between quasi-steady estimates and observed variable flow filtration is shown in FIG. 30. The quasi-steady estimates are in very good agreement with the experimentally measured variable flow filtration further indicating that unsteady effects are not significant in this filter for the considered breath patterns.

Accordingly, embodiments of the present disclosure provide filter combinations that mimic expected average tracheobronchial deposition in humans. According to embodiments, the filter elements are made of stainless steel which is well suited to chemical assay due to its resistance to solvents. Use of embodiments of the filter downstream of an Alberta Idealized Throat while testing an inhaler give an accurate estimate of tracheobronchial lung dose in a simple and efficient manner. According to the inventive approach described herein, filters are developed to emulate deposition efficiencies of different regions of the lungs and for populations that have different deposition characteristics due to differing lung morphology due to disease or age.

Embodiments of the present disclosure further provide filters for different regions of the lung in addition to the tracheobronchial and alveolar regions described above. According to some embodiments, the inventive filters are used for testing intersubject variability in deposition in the different regions of the lung by being designed to mimic the lower and upper limits of expected in vivo regional lung deposition as opposed to mimicking the average regional deposition. Embodiments of the present disclosure also provide filters that mimic regional deposition in children or infants, with breath simulation supplying realistic pediatric inhalation profiles.

The references cited herein are hereby incorporated by reference in their entireties.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

CITED REFERENCES

Anderson, A. A. (1974, March 5th). U.S. Pat. No. 3,795,135.
Brown, R. C. (1980). Porous Foam Size Selectors for Respirable Dust Samplers. *Journal of Aerosol Science*, 11(2), 151-159.
Byron, P. R., Hindle, M., Lange, C. F., Longest, P. W., McRobbie, D., Oldham, M. J., . . . Finlay, W. H. (2010). In Vivo—In Vitro Correlations: Predicting Pulmonary Drug Deposition from Pharmaceutical Aerosols. *Journal of Aerosol Medicine and Pulmonary Drug Delivery*, 23(S2), S59-S69.
Chen, C.-C., Lai, C.-Y., Shih, T.-S., & Yeh, W.-Y. (1998). Development of Respirable Aerosol Samplers using Porous Foams. *American Industrial Hygiene Association Journal*, 59(11), 766-773.
Chung, K. Y., Aitken, R. J., & Bradley, D. R. (1997). Development and Testing of a New Sampler for Welding Fume. *The Annals of Occupational Hygiene*, 41(3), 355-372.
Clark, A., & Borgstrom, L. (2002). In Vitro Testing of Pharmaceutical Aerosols and Predicting Lung Deposition from In Vitro Measurements. In H. Bisgaard, C. OCallaghan, & G. C. Smaldone, *Drug Delivery to the Lung* (pp. 105-142). New York: Marcel Dekker.
Clark, P., Koehler, K. A., & Volckens, J. (2009). An Improved Model for Particle Deposition in Porous Foams. *Journal of Aerosol Science*, 40(7), 563-572.
Courbon, P., Wrobel, R., & Fabrics, J.-F. (1988). A new individual respirable dust sampler: the CIP 10. *Annals of Occupational Hygiene*, 32(1), 129-143.
Davies, C. N. (1973). *Air Filtration*. London: Academic Press.
Finlay, W. H. (2001). *The Mechanics of Inhaled Pharmaceutical Aerosols: An Introduction*. San Diego: Academic Press.
Hickey, A. J. (2004). Chapter 11: Methods of Aerosol Particle Size Characterization. In A. J. Hickey, *Pharmaceutical Inhalation Aerosol Technology* (pp. 219-253). New York: CRC Press.
Hinds WC. Aerosol technology: Properties, behavior, and measurement of airborne particles. New York: Wiley; 1999.
ICRP. (1994). Human Respiratory Tract Model for Radiological Protection. ICRP Publication 66. *Annals of the ICRP*, 24(1-3).
Koehler, K. A., & Volckens, J. (2013). Development of a Sampler to Estimate Regional Deposition of Aerosol in the Human Respiratory Tract. *Annals of Occupational Hygiene*, 57(9), 1138-1147.
Kuo, Y.-M., Huang, S.-H., Shih, T.-S., Chen, C.-C., Weng, Y.-M., & Lin, W.-Y. (2005). Development of a Size-Selective Inlet-Simulating ICRP Lung Deposition Fraction. *Aerosol Science and Technology*, 39(5), 437-443.
Marple, V. A., & Miller, N. C. (1994, September 6). U.S. Pat. No. 5,343,767.
Marple, V. A., Roberts, D. L., & Liu, B. Y. (2002, September 2). U.S. Pat. No. 6,453,758 B1.
Sleeth, D. K., Balthaser, S. A., Collingwood, S., & Larson, R. R. (2016, March 7). Estimation of the Human Extrathoracic Deposition Fraction of Inhaled Particles Using a Polyurethane Foam Collection Substrate in an IOM Sampler. *International Journal of Environmental Research and Public Health*, 13(3), 292.
Stapleton, K. W., Guentsch, E., Hoskinson, M. K., & Finlay, W. H. (2000). On the Suitability of kappa-epsilon Turbulence Modeling for Aerosol Deposition in the Mouth and Throat: A Comparison with Experiment. *Journal of Aerosol Science*, 31(6), 739-749.
Tomyn, R. L., Sleeth, D. K., Thiese, M. S., & Larson, R. R. (2016). The Effect of Neutralized Particles on the Sampling Efficiency of Polyurethane Foam used to Estimate the Extrathoracic Deposition Fraction. *Journal of Occupational and Environmental Hygiene*, 13(2), 133-140.
USP-NF. (2017). 42(6) *In-Process Revision: General Chapter <601> Inhalation and Nasal Drug Products: Aerosols, Sprays, and Powders—Performance Quality Tests*. Rockville, MaryLand, USA: U.S. Pharmacopeial Convention.
Vincent, J. H., Aitken, R. J., & Mark, D. (1993). Porous Plastic Foam Filtration Media: Penetration Characteristics and Applications in Particle Size-Selective Sampling. *Journal of Aerosol Science*, 24(7), 929-944.

The invention claimed is:

1. A filter for aerosol particle deposition sampling, said filter comprising:
a plurality of filter layers of filter material stacked coaxially, the filter material being formed from fibers wherein the filter material of each of said plurality of filter layers independently comprises fibers with a fiber diameter of 20 µm to 45 µm and has a mesh number of 80 to 500 mesh, and said filter has a face diameter of 30 mm to 80 mm; and
an outer ring portion encircling the filter material and securing said plurality of filter layers;
said filter having a filter efficiency (E) that mimics in-vivo tracheobronchial aerosol deposition in a tracheobronchial region of a subject over the range of physiological inhalation flow rates.

2. The filter of claim 1 wherein E is $$E = 1 - \exp\left(\frac{-4\alpha E_\Sigma t}{\pi d_f}\right)$$

where α is a volume fraction of fibers, t is a thickness of the filter, $d_f$ is the fiber diameter, and $E_\Sigma$ is a single fiber deposition efficiency.

3. The filter of claim 2 wherein the single fiber deposition efficiency is equal to $$E_\Sigma = E_I + E_R + E_D + E_{DR} + E_G$$

where $E_I$ is deposition due to impaction, $E_R$ is deposition due to interception, $E_D$ is deposition due to diffusion, $E_{DR}$ is deposition due to interception of diffusing particles, and $E_G$ is deposition due to gravitational settling.

4. The filter of claim 3 wherein deposition due to impaction is equal to $$E_I = \frac{(Stk)J}{2Ku^2}$$

where Stk is a particle Stokes number, Ku is a Kuwabara hydrodynamic factor, and J is a factor accounting for filter properties.

5. The filter of claim 4 wherein the particle Stoke number is equal to $$Stk = \frac{\tau U_0}{d_f}$$

where $\tau$ is a particle relaxation time, $U_0$ is a face velocity, and $d_f$ is the fiber diameter, or the Kuwabara hydrodynamic factor is equal to $$Ku = -\frac{\ln\alpha}{2} - \frac{3}{4} + \alpha - \frac{\alpha^2}{4}$$

where $\alpha$ is the volume fraction of fibers, or the factor accounting for filter properties is equal to $$J = (29.6 - 28\alpha^{0.62})R - 27.5R^{2.8}$$

where R is a ratio of particle diameter to fiber diameter and $\alpha$ is the volume fraction of fibers, or a combination thereof.

6. The filter of claim 4 wherein R is less than 0.4.

7. The filter of claim 4 wherein J is 2.0.

8. The filter of claim 3 wherein deposition due to interception is equal to $$E_R = \frac{(1-\alpha)R^2}{Ku(1+R)}$$

where R is the ratio of particle diameter to fiber diameter, $\alpha$ is the volume fraction of fibers, and Ku is a Kuwabara hydrodynamic factor, or wherein deposition due to diffusion is equal to $$E_D = 2Pe^{-2/3}$$

where Pe is a Peclet number, or deposition due to interception of diffusing particles is equal to $$E_{DR} = \frac{1.24R^{2/3}}{(KuPe)^{1/2}},$$

or deposition due to gravitational settling is equal to $$E_G = G(1+R)$$

where G is a ratio of settling velocity to face velocity or a combination thereof.

9. The filter of claim 8 wherein the Peclet number is equal to $$Pe = \frac{d_f U_0}{D}$$

where $U_0$ is a face velocity, $d_f$ is the fiber diameter, and D is a particle diffusion coefficient.

10. The filter of claim 1 wherein the fibers of the filter material are cylindrically shaped or said plurality of filter layers comprises one to seven layers of filter material, said filter is a variable diameter filter in the shape of a cone, or a combination thereof.

11. The filter of claim 10 wherein said filter comprises three layers of filter material.

12. A regional lung deposition system comprising:
 a throat simulation device;
 a filter housing downstream of and in fluid communication with the throat simulation device;
 a breath simulator downstream of and in fluid communication with the filter housing; and
 a first filter of claim 1 positioned within the filter housing downstream of the throat simulation device and upstream of the breath simulator.

13. The regional lung deposition system of claim 12 further comprising a second filter positioned within the filter housing downstream of the first filter and upstream of the breath simulator.

14. The regional lung deposition system of claim 12 wherein the throat simulator device is an Alberta Idealized Throat or mimics aerosol deposition in an extrathoracic region of a subject.

15. The regional lung deposition system of claim 12 wherein the first filter mimics aerosol deposition in a tracheobronchial region of a subject.

16. The regional lung deposition system of claim 12 wherein the second filter mimics aerosol deposition in an alveolar region of a subject.

17. A filter housing for use in the regional lung deposition system of claim 12, said filter housing comprising:
 a conical housing having a small inner diameter at a first end and a large inner diameter at a second end.

18. The filter housing of claim 17 wherein said conical housing has a 10° draft from the first end to the second end.

19. The filter housing of claim 17 further comprising shims configured to separate said plurality of filter layers of said filter.

20. The filter housing of claim 17 further comprising a collar configured to hold said filter in place within said filter housing.

\* \* \* \* \*